United States Patent [19]

Laing

[11] Patent Number: 5,059,765
[45] Date of Patent: Oct. 22, 1991

[54] METHOD OF OPERATION FOR HIGH SPEED AUTOMATIC WELDING

[75] Inventor: Brian S. Laing, Houston, Tex.

[73] Assignee: CRC-Evans Pipeline International, Inc., Houston, Tex.

[21] Appl. No.: 474,001

[22] PCT Filed: Jan. 4, 1990

[86] PCT No.: PCT/US90/00021

§ 371 Date: Jan. 4, 1990

§ 102(e) Date: Jan. 4, 1990

[51] Int. Cl.$^5$ .............................................. B23K 9/12
[52] U.S. Cl. ............................ 219/125.11; 219/130.5; 219/137.71
[58] Field of Search .............. 219/130.5, 124.34, 125.1, 219/125.11, 137.71

[56] References Cited

U.S. PATENT DOCUMENTS

| | | | |
|---|---|---|---|
| 3,555,239 | 1/1971 | Kerth | 219/130.5 |
| 3,838,244 | 9/1974 | Petrides et al. | 219/130.5 |
| 4,144,992 | 3/1979 | Omae et al. | 228/102 |
| 4,145,593 | 3/1979 | Merrick et al. | 219/60 A |
| 4,163,886 | 8/1979 | Omae et al. | 219/125.11 |
| 4,188,525 | 2/1980 | Merrick et al. | 219/125.12 |
| 4,194,106 | 3/1980 | Rudaz et al. | 219/123 |
| 4,283,617 | 8/1981 | Merrick et al. | 219/125.1 |
| 4,288,681 | 9/1981 | Niemann | 219/125.11 |
| 4,328,050 | 5/1982 | Ashizawa et al. | 148/9 R |
| 4,368,375 | 1/1983 | Merrick et al. | 219/125.12 |
| 4,378,483 | 3/1983 | Hahn | 219/124.1 |
| 4,390,954 | 6/1983 | Manning | 219/130.5 |
| 4,497,019 | 1/1985 | Waber | 364/132 |
| 4,559,430 | 12/1985 | Hayakawa | 219/61 |
| 4,645,902 | 2/1987 | Hayakawa | 219/125.11 |

Primary Examiner—Clifford C. Shaw
Attorney, Agent, or Firm—Richards, Medlock & Andrews

[57] ABSTRACT

An automatic welder is used in an internal welder unit which travels along the interior of a pipeline and provides the interior weld passes at the junction of abutting pipe joints. The internal welder unit has an electronic control system which includes a plurality of microprocessor control units, each of which performs specific functional operations for the internal welder unit. The microprocessor control units are interconnected by a serial communication link which permits the transmission of commands and data between all of the microprocessor control units. The control system includes a back end control unit positioned in the internal welder unit, a front end control unit with a panel in the weld unit, a reach rod control unit at the end of a reach rod and a power supply control unit adjacent the arc power supply. The control system directs the operation of orbiting internal welders to have a zero or slow travel speed at a start point to ensure a high reliablity of arc initiation. After the arc is started, the travel speed of the internal welders is accelerated to a high speed rate for the majority of the weld pass. At the end of the weld pass, the welders travel rate and wire feed rate are suddenly reduced to zero for the weld termination. The control system can extend to include one or more external welders, as well as external monitoring and control devices, all of which communicate through the serial communication link.

4 Claims, 17 Drawing Sheets

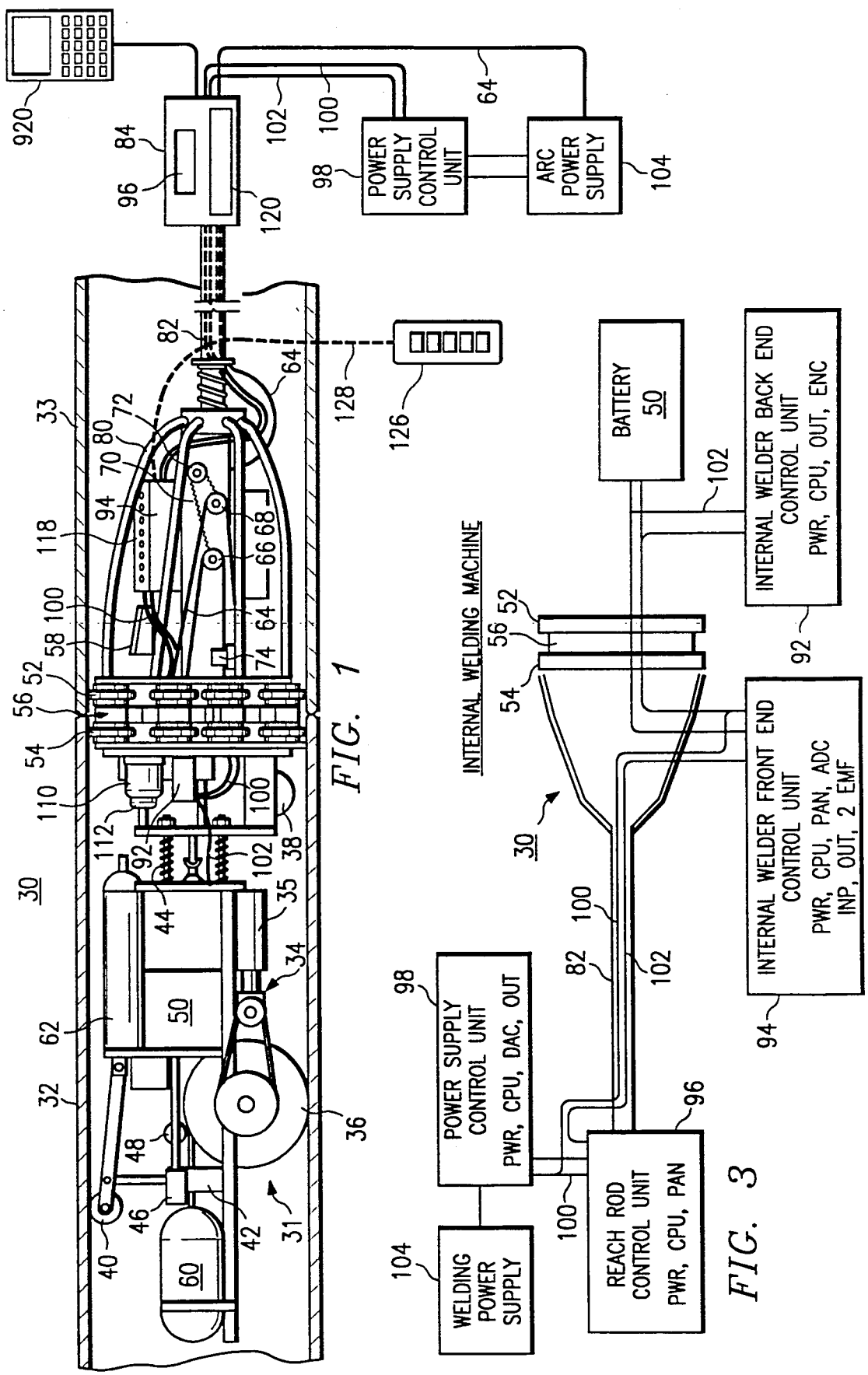

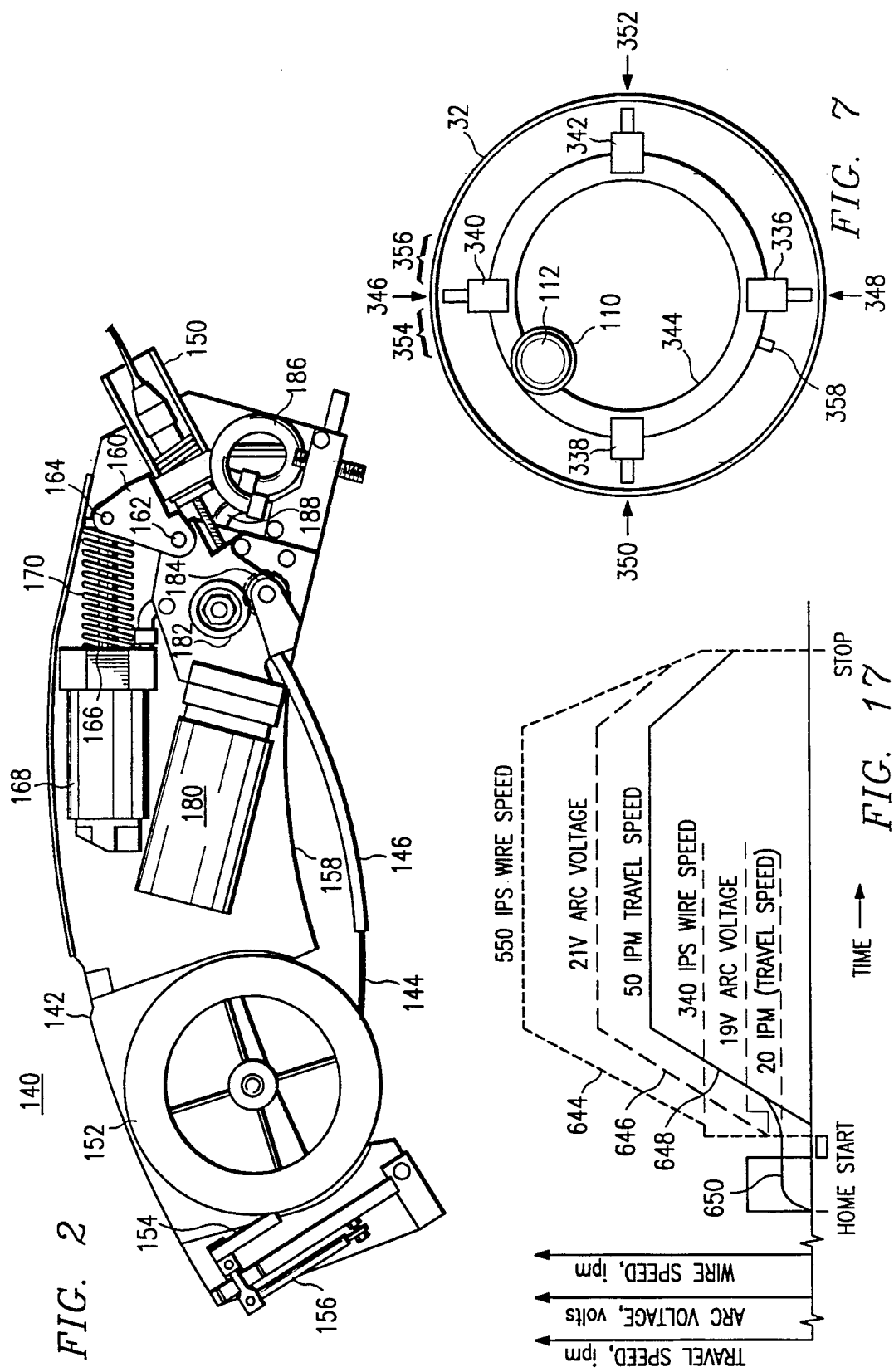

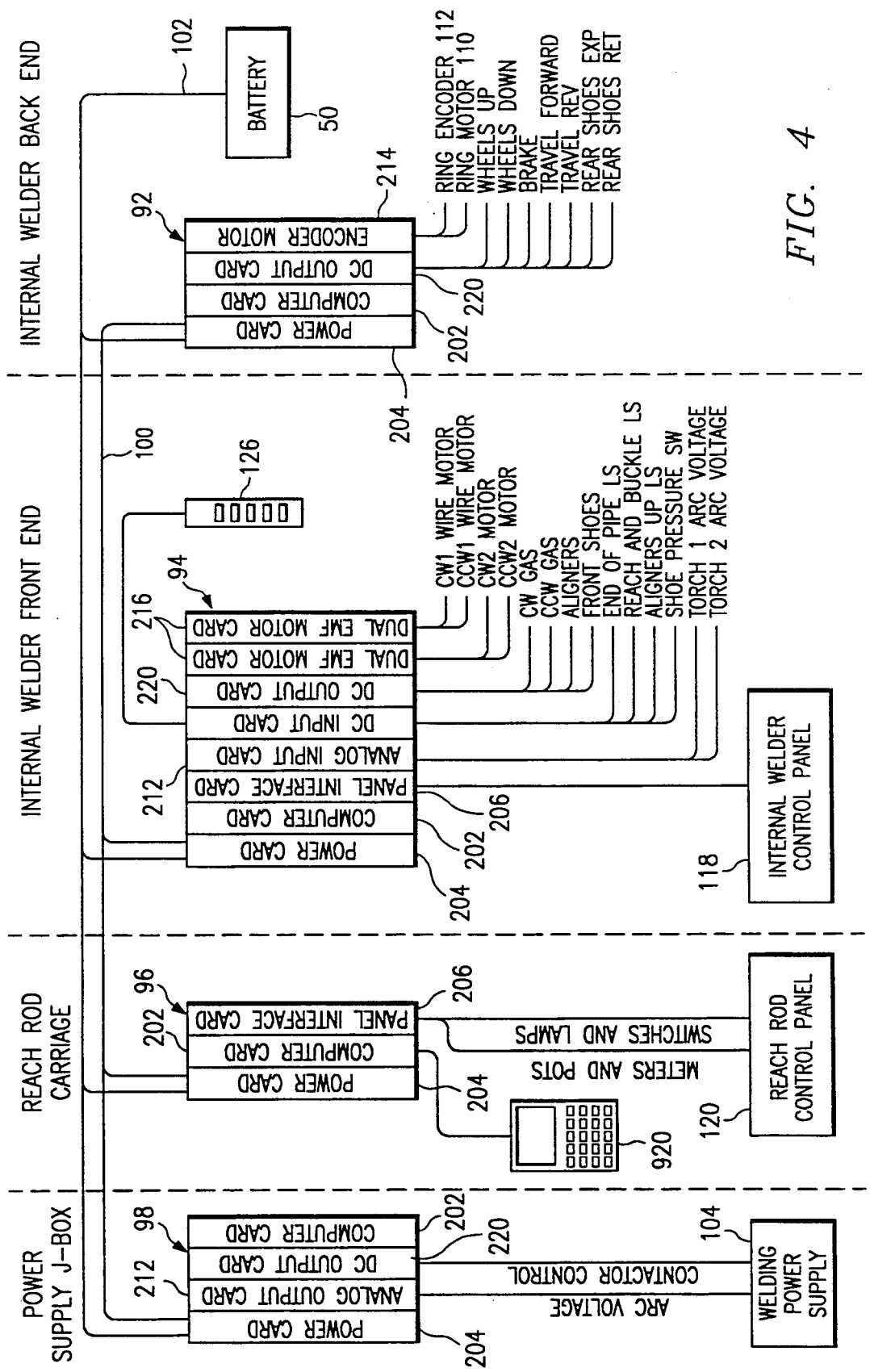

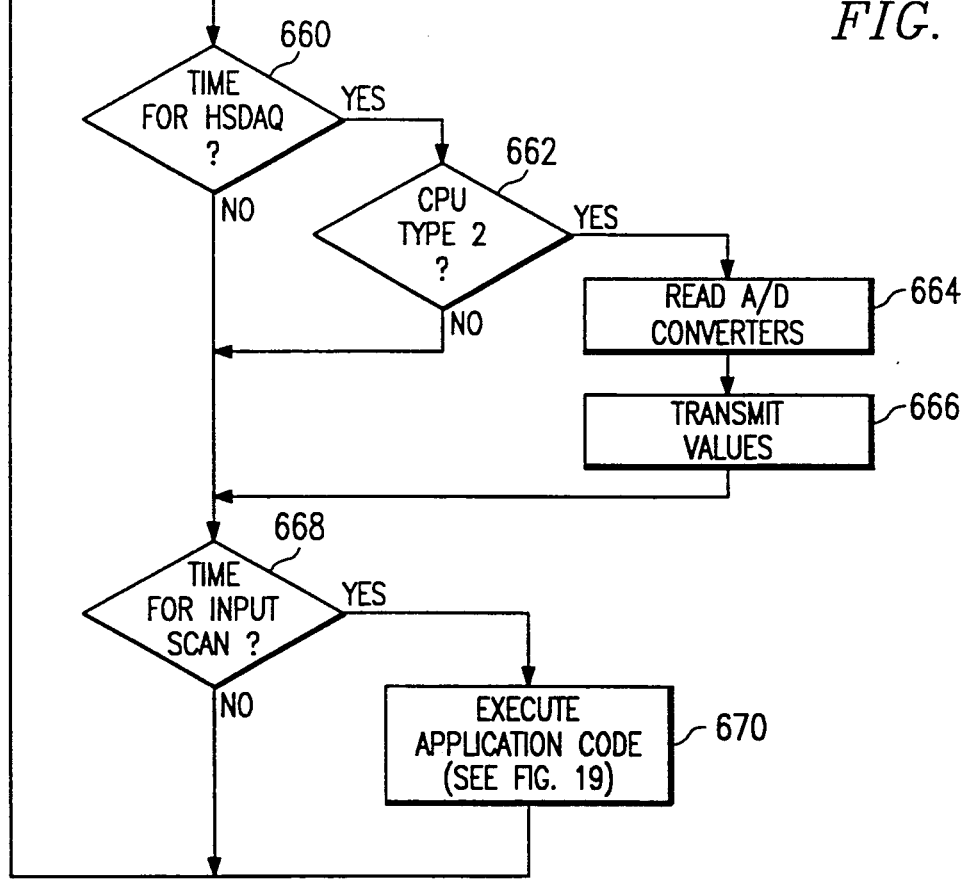
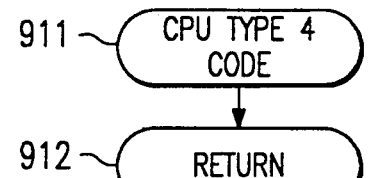
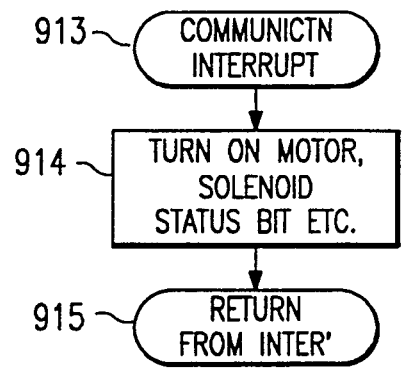
FIG. 23
FIG. 24
FIG. 18

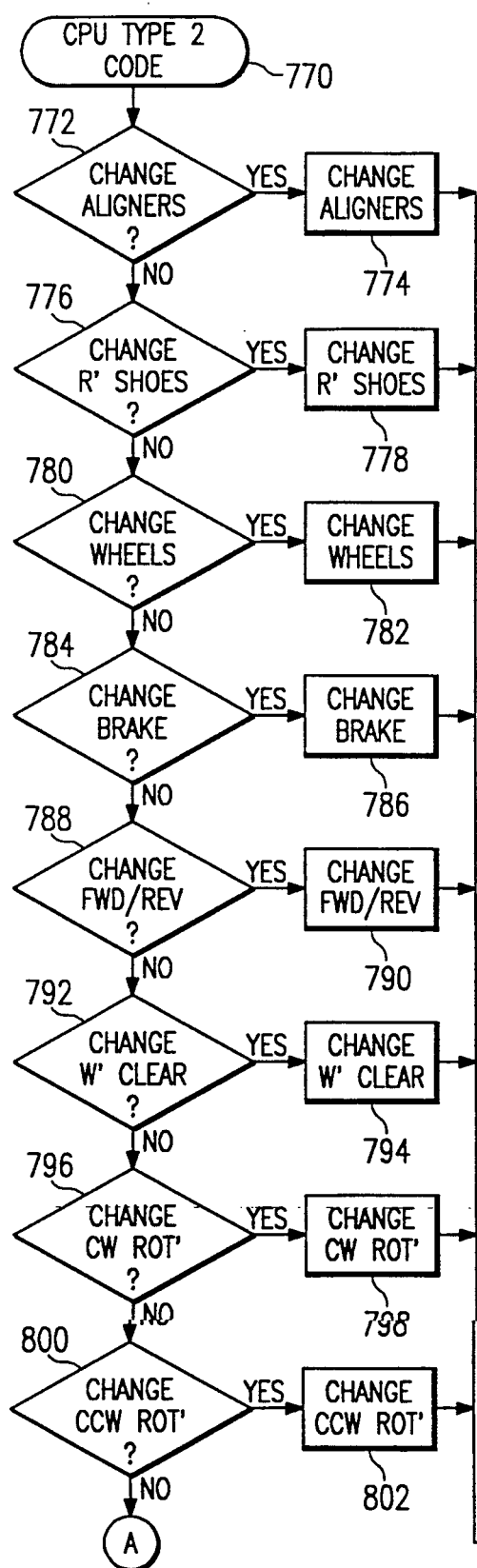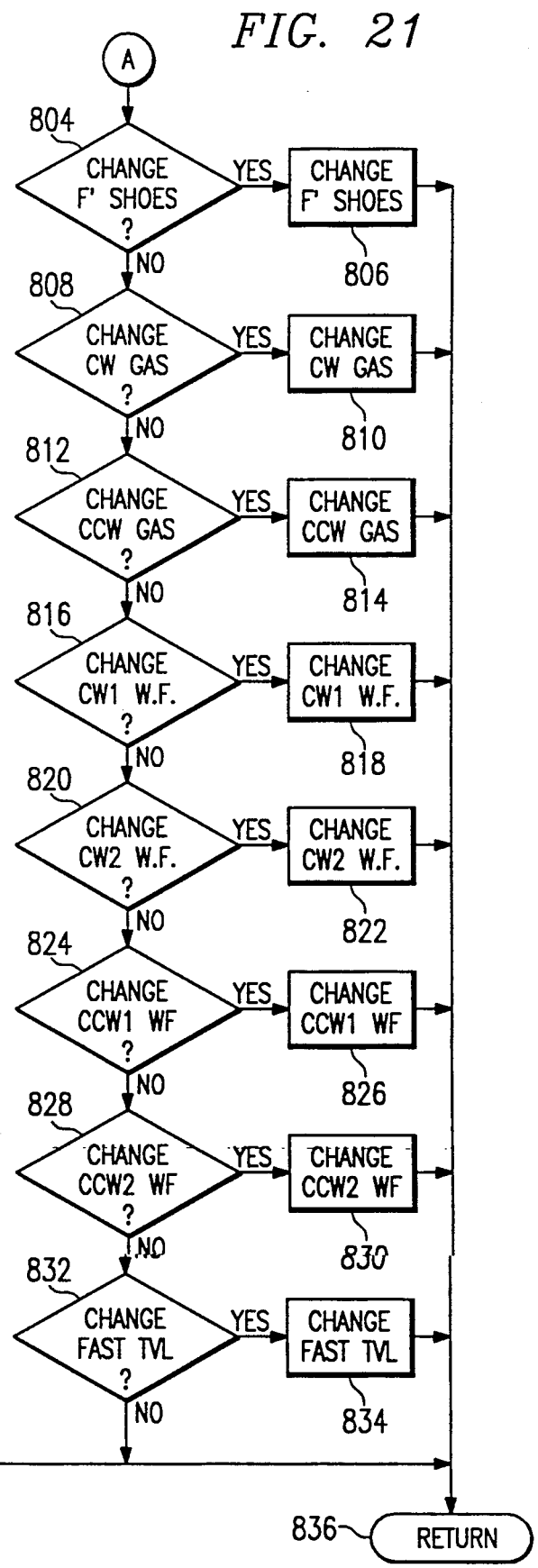
FIG. 21

METHOD OF OPERATION FOR HIGH SPEED AUTOMATIC WELDING

FIELD OF THE INVENTION

The present invention pertains in general to welding and in particular to a method of operation for automatic welding equipment.

BACKGROUND OF THE INVENTION

In the construction of pipelines it is necessary to perform welding on the pipeline joints both internally and externally. Access is not a problem in performing the external weld, but it is a very substantial problem in performing the internal weld pass. Since human access is impossible in most applications, there have been developed automated internal welding machines which perform this operation. Such an internal welding machine is shown in U.S. Pat. No. 3,612,808 to Nelson. An internal automatic welder is described in U.S. Pat. No. 4,525,616 to Slavens.

Although internal welders are in wide use throughout the world in the construction of pipelines, these welders have drawbacks which limit their productivity and increase the cost of operation. A specific limitation in the use of automated welding equipment, which is particularly acute for internal welders, is the speed at which the welding pass is performed. In an internal welding operation it is difficult and expensive to make repairs for defective welds. It is, therefore, imperative that the equipment work properly for a very high percentage of the welding operations. This, however, has led to a productivity trade-off. At slower travel speeds for the automatic welder, there is a higher probability that the arc will be struck and properly initiated. If higher traveling speeds are selected, the probability of properly striking an arc is reduced. Therefore, since reliability is of utmost importance, the travel speed of automatic internal welders has been set to a relatively slow rate to ensure proper arc initiation. However, the slow rate required for high reliability arc initiation causes the entire weld sequence to be excessively time consuming. Thus, a principal drawback of conventional automated welding equipment, and in particular internal automated welders, is the slow travel speed necessary for high quality welds.

A further limitation in the use of internal welders is the complex and expensive electronic control system required to operate the welders. A substantial number of mechanical and electrical operations must be carried out in using an internal welder machine. These steps include moving the machine along the pipeline, properly aligning the machine to the end of the pipe joint, clamping the machine to one pipe joint and then to a next pipe joint, positioning the internal welders to the appropriate positions for starting and stopping the weld passes, clamping the machine within the pipes, initiating welder operation including starting travel of the welders, providing feed wire and providing a shielding gas. Further, the arc must be constantly monitored for each of the welders and provision must be made for starting and stopping the welders at appropriate locations. Almost all of these functions must be initiated, monitored and stopped through electronic equipment. However, an internal welder must function in a severe environment It must be used in adverse weather conditions with extremes of temperature, humidity and exposure to dust and smoke. The unit is also subject to extreme physical stresses and rough handling. The electronic control system in addition is subjected to a harsh electrical environment due to the static, transients and high currents produced by arc welding. The extremely high current levels used in such welding create substantial magnetic fields that can affect the operation of electronic components. In addition, welding equipment of this nature is often used in remote locations and it is difficult to provide maintenance and spare parts. Thus, simplicity and a minimum number of parts for the control system is of great importance.

Further, the large number of control operations required to operate an internal welder result in the creation of a very large cable bundle having numerous wires for operating the large number of solenoids, switches and other electronic components. A large cable bundle of this type can be accommodated in large internal welders, but on smaller units, such as 20 inch and smaller internal welder units, such a cable bundle is very difficult to accommodate. It can interfere with the operation of the internal welder unit and is more subject to damage in operation. Thus, there is a distinct need for an improved electronic control system for automated welding operations and in particular, there is a need for a more reliable, less complex and physically smaller control system for an internal welding machine.

SUMMARY OF THE INVENTION

A selected embodiment of the present invention is a method for welding together two pipe joint work pieces which are butted together and have a gap at the junction of the pipe joints. The welding is performed by use of a welder which travels along the gap and provides an arc through a feed wire which is supplied into the gap. The method commences with the step of establishing a start point for a weld and a stop point for the weld along the gap. The welder is next positioned along the gap at the start point. At the start point, there is initiated the feeding of an electrode wire into the gap and the initiation of the arc in the gap. After the arc has been initiated, the travel speed of the welder is increased from a first speed at the start point to a second travel speed along the gap. Also, after the initiation of the arc, the speed of the wire into the gap is increased until the wire speed reaches a preselected rate. Finally, the welder is moved along the gap at the second travel speed toward the stop point for the weld.

In a further aspect of the present invention, the travel speed of the welder and wire speed are rapidly reduced to zero when the welder reaches the stop point of the weld.

In a still further aspect of the present invention, the arc voltage is set to a first voltage at the initiation of the arc and the arc voltage is increased from this first voltage to a second voltage concurrent with the increase of the welder travel speed from the first speed to the second speed.

BRIEF DESCRIPTION OF THE DRAWINGS

For a more complete understanding of the present invention and the advantages thereof, reference is now made to the following description taken in conjunction with the accompanying drawings in which:

FIG. 1 is an elevation, partially sectioned, view of an internal welder carriage for use in conjunction with the present invention, FIG. 2 is a elevation view of an internal welder which can be used in conjunction with the present invention, FIG. 3 is a block diagram illustrating the location and interconnection of the electronic functional units which make up the control system of the present invention, FIG. 4 is a block diagram showing the functional units of the control system of the present invention, the circuit cards which make up each functional unit, the interconnection of the functional units, and control panels for two of the functional units, FIG. 7 is a illustration of the operation of internal welders used in conjunction with the present invention, FIG. 17 is a graph illustrating travel speed for the internal welder, arc voltage for the weld and wire speed, all as functions of internal welder position, FIG. 18 is a flow diagram illustrating the initial operation steps for the software in each of the CPUs, FIG. 21 is a flow diagram illustrating the operation of the CPU 2 applications, FIG. 23 is a flow diagram illustrating the operation of the CPU 4 application, FIG. 24 is a flow diagram illustrating the operation of a communication interrupt for any of the CPUs.

DETAILED DESCRIPTION OF THE INVENTION

Figure 5:
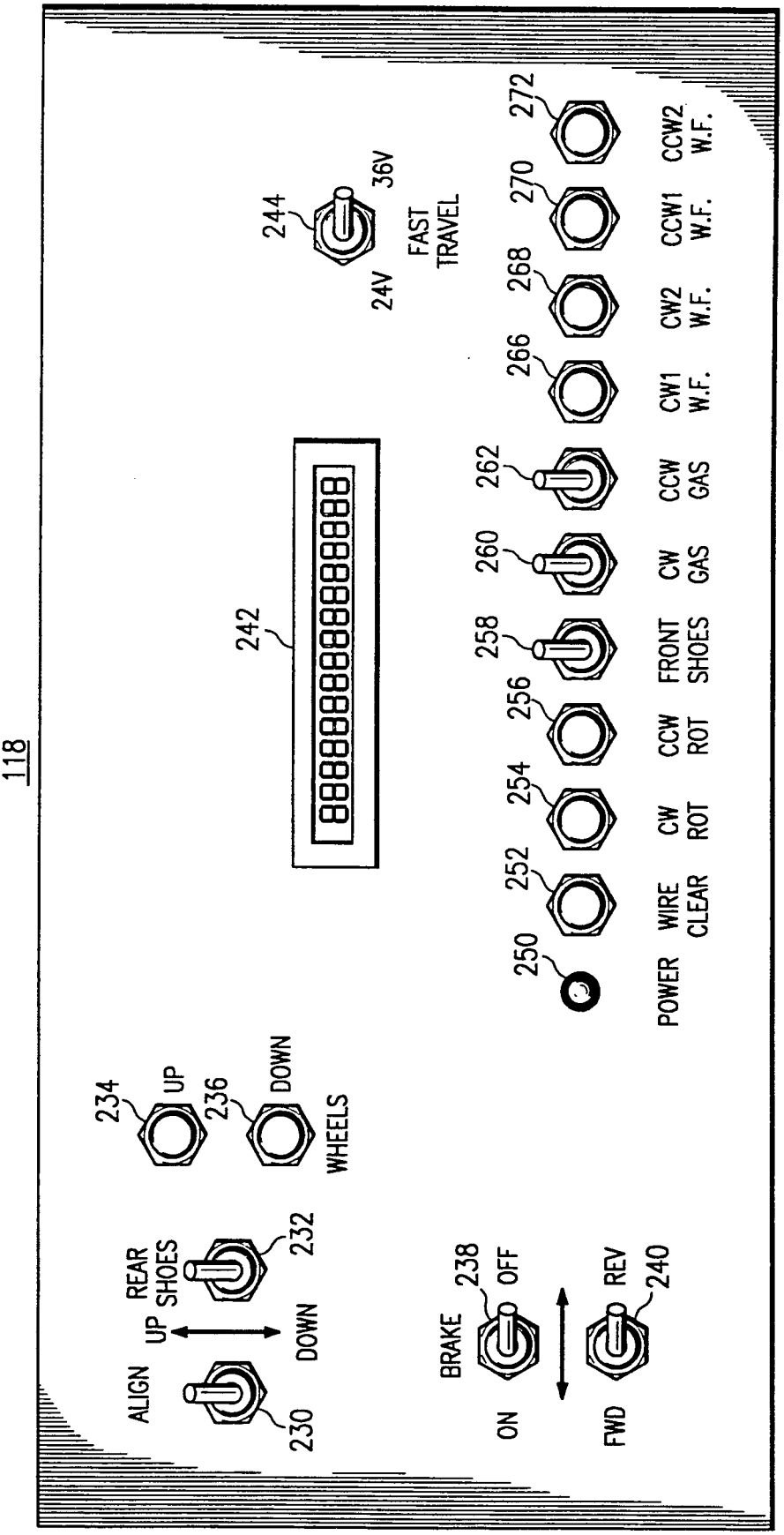
FIG. 5 is an illustration of an internal welder front end control panel, as shown in FIG. 4.

A sectional view of an internal welder unit 30 as used in conjunction with the present invention is illustrated in FIG. 1. The physical components and operation of this unit are described in detail in U.S. Pat. No. 3,612,808 to Nelson which was filed on June 4, 1969, which patent is incorporated herein by reference. FIG. 2 is an illustration of an internal welder 140 as used with the internal welder unit 30.

A further internal welder which may be used in conjunction with the present invention is shown in U.S. Pat. No. 3,632,959 to Nelson et al which issued on Jan. 4, 1972 and is herein incorporated by reference.

Referring to FIG. 1, the internal welder unit 30 is positioned within a pipe joint 32. The unit 30 includes a drive assembly 34 having a motor 35 for driving a drive wheel 36. The drive assembly further includes front wheels 38 and a balancing wheel 40. An actuator 42 moves the balancing wheel 40 against the top interior of the pipe joint 32.

A flexible mounting 44 is provided between the forward portion of the unit 30 and the drive assembly 34 to prevent forced misalignment of any components of the unit 30 when it is clamped at the end of the pipe joint 32. The unit 30 further includes a forward clamping assembly 52 and a rear clamping assembly 54. These assemblies operate respective front and rear shoes of the unit 30. A welding assembly 56 is positioned between the clamping assembly 52 and 54. The welding assembly 56 includes the welding torches, the related consumables supply and mechanical operation devices for providing a weld between abutting pipe joints 32 and 33. The facing ends of the joints 32 and 33 are machined to provide a welding gap on both the interior and exterior surfaces. The internal welder 140, which is part of the assembly 56, for providing the internal weld is described in reference to FIG. 2.

Aligners 58 are provided to align the internal welder unit at the end of the pipe joint 32 before the joint 33 is moved into position. A plurality of the aligners 58 are provided around the periphery of the unit 30. The aligners 58, under pneumatic pressure, extend outward and when the internal welder unit 30 is moved back into the joint 32, the aligners 58 engage the end of the pipe joint 32 thus positioning the internal welders in the assembly 56 at the junction of the pipe joints 32 and 33.

The internal welding unit 30 further includes a tank 60 which supplies compressed air or other suitable gas for actuation of the clamping assemblies 52 and 54 as well as the actuator 42 and alignment actuators. The unit 30 further includes a tank 62 for providing a shielding gas for the welding arc.

A battery 50 provides electrical power for the drive assembly 34 and the electronic control system.

The electrical power for the arc welding is provided through a power cable 64 into the unit 30 and wrapped around sheaves 66 and 68 which are tensioned by a spring 70 which is connected to a sheave 72. This spring arrangement gives relief to tension for the power cable 64 and protects it from stress. The power cable 64 is connected to a manifold block 74 which is in turn connected to a welding current bar (not shown) for providing welding current to the torches.

The unit 30 further includes a tubular frame 80 at the forward end thereof which serves to protect and support the components housed therein. A hollow reach rod 82 is connected to one end to the forward end of the frame 80 and at the opposite end to a reach rod control box 84. Shielding gas for the welding arcs is provided through the reach rod 82 and stored in the tank 62.

The internal welder unit 30 includes a distributed processing electronic control system which includes a plurality of microprocessor control units. These include a back end control unit 92, a front end control unit 94, a reach rod control unit 96 and power control unit 98. Each of these control units is connected in parallel to a common serial communication link 100.

A two lead power line 102 is connected to the battery 50 to provide power to each of the microprocessor control units 92, 94, 96, and 98.

The unit 30 further includes a plurality of internal welders, such is shown in FIG. 2, that are mounted on a rotating ring, described below. The ring is driven by a motor 110 which is provided with a position encoder 112. The encoder 112 produces a digital data signal which indicates relative position of the ring, which carries the welding torches. (See FIG. 7).

The power supply control unit 98 is connected to control the operation of power supply 104. A representative power supply is a model R3S-400 made by Lincoln Electric Co.

The communication protocol for the link 100 is termed carrier sense multiple access with collision detection (CSMA/CD) and is described in IEEE Standard 802.3.

Figure 6:
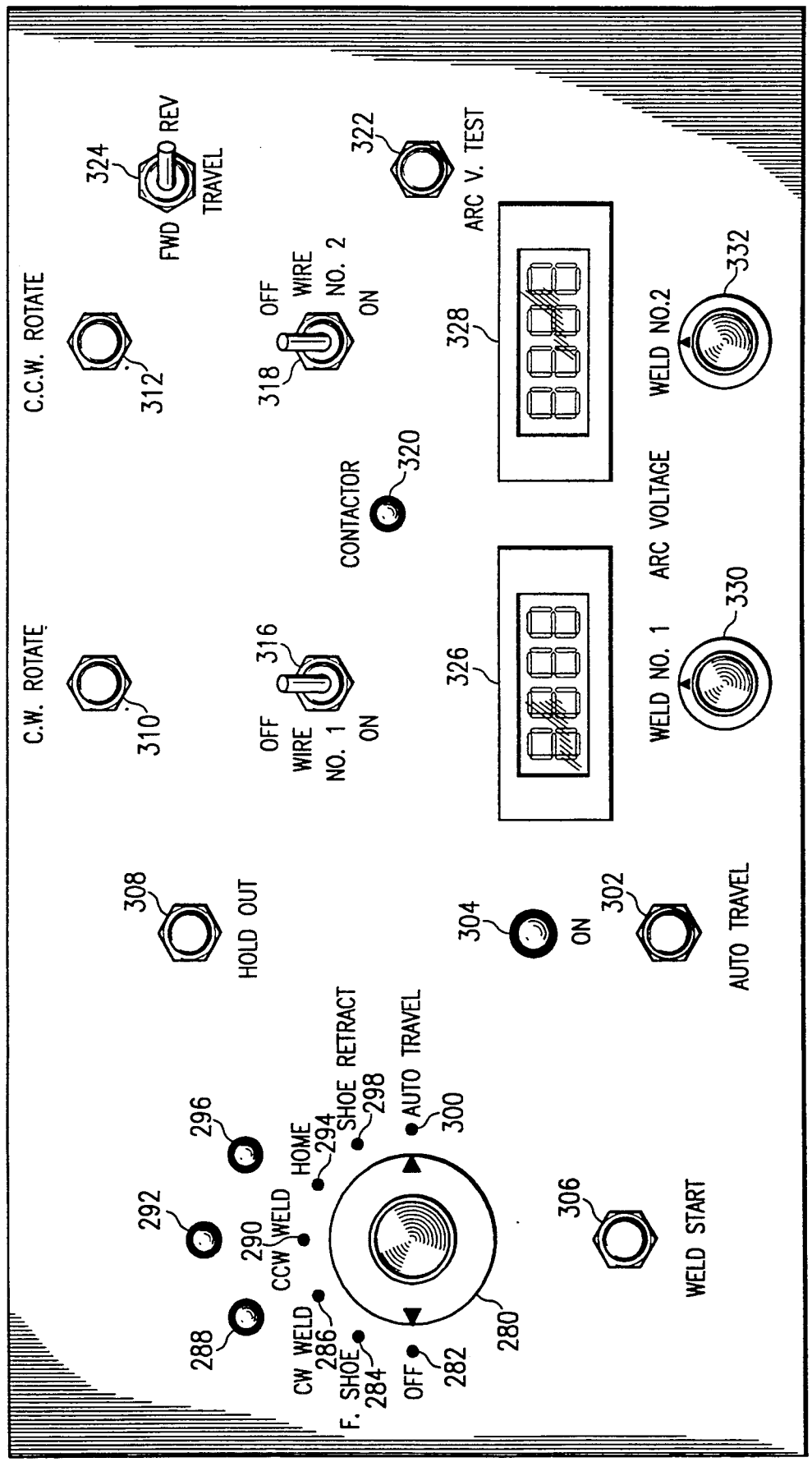
FIG. 6 is an illustration of an internal welder reach rod control panel, as shown in FIG. 4.

The front end control unit includes a control and display panel 118 (see FIG. 5) and the reach rod control box 84 includes a display and control panel 120 (see FIG. 6).

In the operation of the unit 30, it is necessary to set the positions of the internal welders. This is done with a hand-held training unit 126 which is connected to the microprocessor control unit 94 before the pipe joint 33 is set in the position shown so that the operator has access to panel 118. The unit 94 includes a display for showing the encoder 112 reading. The unit 126 has buttons for defining the home, start and stop positions for the clockwise and counterclockwise welding passes. The operator positions the internal welders to the appropriate locations and depresses the corresponding button to define a position. These positions, as defined by the encoder 112, are stored in the control unit 94 and used in the welding operation to define the movement of the internal welders.

Referring now to FIG. 2 there is shown an internal welder 140 which may be used in conjunction with the present invention. Note that a detailed description of the internal welder construction and operation is provided in U.S. Pat. No. 3,612,808. The welder 140 includes a cartridge 142 for providing feed wire 144 as a welding electrode through a tube 146 to a welding nozzle 150.

The feed wire 144 is wrapped about an electrode reel 152. The pivoting arm 154 is biased by a spring 156 against the reel 152 while starting the rotation of the reel.

The nozzle 150 is pivotally mounted on a carriage body 158. The welding nozzle 150 is secured to arms 160 which are mounted by a pin 162 to the body 158. The arm 160 is further secured by a pin 164 to an arm 166 that is connected to an actuator 168. A spring 170 surrounds the arm 166. The spring 170 urges the welding nozzle 150 away from its welding position, and thus it is necessary to deliver pressurized gas to the actuator 168 to move the nozzle 150 to its welding position. This spring retraction is for the purpose of moving the heads into a protective position when moving the next pipe joint into position over the assembly 52. The electrode 144 is fed to the nozzle 150 by a mechanism which includes a motor 180 which drives a wheel 182 that is resiliently held against a bearing 184. As the wheel 182 is rotated, the wire 144 is fed into the nozzle 150.

Tubes 186 and 188 provide shielding gas to the nozzle 150.

While an internal welder 140 has been described in reference to FIG. 2. A selected internal welder may be used as shown in U.S. Pat. No. 4,525,616 to Slavens which patent is incorporated herein by reference. This internal welder provides an oscillating nozzle so that the seam, or gap, between the abutting pipe joints can be automatically tracked by monitoring the amplitude of the current during the nozzle oscillations.

Referring now to FIG. 3 there is illustrated a schematic, block diagram of the control system for the welder 30. Note that each of the microcomputer control units 92, 94, 96 and 98 is connected in common to the communication link 100. The control unit 98 and welding power supply 104 are typically located at a distance in excess of 100 feet from the reach rod control unit 96.

Referring now to FIG. 4 there is illustrated in block diagram form the control system for the unit 30. The microprocessor control units 92, 94, 96 and 98 are connected in parallel by the communication link 100. Power is supplied to the control units through two wire power line 102 from the battery 50. This is a twenty-four volt line.

The microprocessor control units 92-98 each contain a plurality of printed circuit cards for carrying out the required functions at that control unit. Each of the control units includes a computer (CPU) card and a power supply card. The configuration for each of the control units is as follows:

Control Unit 92

1. CPU Card
2. Power Supply Card
3. DC Output Card
4. Encoder Motor Card

Control Unit 94

1. CPU Card
2. Power Supply Card
3. Panel Interface Card
4. Analog Input Card
5. DC Output Card
6. Dual EMF Motor Card
7. Dual EMF Motor Card
8. DC Input Card Control Unit 96

1. CPU Card
2. Power Supply Card
3. Panel Interface Card

Control Unit 98

1. CPU Card
2. Power Supply Card
3. Analog Output Card
4. DC Output Card

The printed circuit cards used in the microprocessor control units include a CPU card 202, a power supply card 204, a panel interface card 206, an analog input card 210, an analog output card 212, an encoder motor card 214, a dual EMF motor card 216, a DC input card 218, and a DC output card 220.

Each of the CPU cards are connected to the communications link 100 through the corresponding power card. The power line 102 is connected to the power supply card 204 for each of the control units. Within each of the control units the cards are interconnected by a sixteen bit data/address bus, as further described below.

The microprocessor control unit 92 has an encoder motor card 214 which receives a ring encoder output from the encoder 112 and provides a drive to the motor 110. A DC output card 220 in the control unit 92 has outputs for controlling the functions of wheels up, wheels down, brake, unit 30 travel forward, unit 30 travel reverse, rear shoes expand and rear shoes retract. The control unit 94 includes two dual EMF motor cards 216, one of which control the clockwise 1 and counterclockwise 1 wire feed motors and the other of which controls the clockwise 2 and counterclockwise 2 wire feed motors for the internal welders. A third and fourth dual EMF motor card 216 controls the torch oscillator motors, if implemented. The DC output card 220 controls the on/off functions of clockwise and counterclockwise shielding gas supply, aligners 58, and front shoes. A DC input card 218 senses the condition of the end of pipe limit switch, reach rod buckle limit switch, aligners up limit switch and shoe pressure switch. Unit 94 further includes an analog input card 210 which senses torch 1 and torch 2 arc voltage. Unit 94 also includes a panel interface card 206, which senses the conditions of the switches and push buttons on the control panel 118 and drives the seven segment displays.

Control unit 96 includes a panel interface card 206, in addition to the CPU card 202 and the power card 204.

The control unit 98 includes a DC output card 220 and an analog output card 212 in addition to the CPU card 202 and the power card 204.

The internal welder control panel 118 is illustrated in FIG. 5. This panel includes a toggle switch 230 which has an up and down position for raising and lowering the aligners 58. The toggle switch 232 further has up and down positions for rear shoes. The wheels 34 and 38 are positioned in up and down positions by respective buttons 234 and 236.

A toggle switch 238 has on and off positions for the brake, which is assembly 48.

A toggle switch 240 has forward and reverse positions for the function of causing travel of the unit 30 through the pipe.

Panel 118 further includes a display 242 which has 16 digits and is used to display help messages as well as counts from the encoder 112. A toggle switch 244 supplies either 24 volt or 36 volt power to the motor 35. The 36 volt power source provides extra speed for the unit 30 when necessary.

The presence of power for the system is indicated by a bulb 250.

A wire clear function is provided by depressing a button 252 which feeds wire from all four torches simultaneously.

Clockwise rotation of the ring 344 (see FIG. 7) is provided by depressing a button 254. Counterclockwise rotation of ring 344 is provided by pressing a button 256.

The front clamping assembly 52 is activated and deactivated by a toggle switch 258.

A toggle switch 260 turns on and off shielding gas for the clockwise internal welders.

A toggle switch 262 turns on and off the shielding gas for the counterclockwise internal welders.

The clockwise number 1 internal welder, unit 340, wire feed is provided by depressing a button 266. The clockwise internal welder number 2, unit 342, wire feed is provided by depressing the button 268. The counterclockwise wire feed 1 unit, internal welder 338, wire feed is provided by depressing a button 270. Likewise, the counterclockwise unit 2, internal welder 336, wire feed is provided by depressing a button 272.

The buttons 254 and 256 as well as the toggle switches 258, 260 and 262 are provided with protective covers to prevent inadvertent activation. The functions carried out by these buttons and toggle switches are needed in a service or maintenance procedure, rather than in routine operation.

The reach rod control panel 120 is illustrated in FIG. 6. A master operation switch 280 controls the sequence of steps for each cycle of operation. The switch 280 has an off position 282. In a front shoe position 284, the switch 280 causes the front shoes to be expanded.

In a position 286, the switch 280 is set to perform the clockwise weld operation. The operation is started by pressing the weld start button 306. A bulb 288 indicates when this is in progress.

In a position 290, the switch 280 is set to perform a counterclockwise weld operation. The operation is started by pressing the weld start button 306. When this operation is in progress, a bulb 292 is illuminated.

In a position 294, the control switch 280 causes the ring 344 (FIG. 7) to rotate to the home position 354, which is the position from which the next weld cycle will begin.

A bulb 296 is illuminated to indicate that the ring 344 has rotated out of the home position. When the switch 280 is set to a position 298, the shoes are retracted to permit the unit 30 to move along the interior of the pipeline.

When the switch 280 is at a position 300, the unit 30 is permitted to travel upon depressing an auto travel button 302. Activation of button 302 is indicated by bulb 304.

The clockwise weld position 286 and counterclockwise weld position 290 set up the potential weld, but the actual weld operations are initiated by button 306.

A hold out button 308, if depressed, stops the entire welding operation should a problem be detected by an operator.

The internal welders are caused to undergo a clockwise rotation when a button 310 is pressed and caused to undergo a counterclockwise rotation when a button 312 is depressed.

A toggle switch 316 is used to disable wire feed for CW1 and CCW1 wire feeders during a welding operation. Wire feed for CW2 and CCW2 can be disabled by toggle switch during a welding operation. The toggle switches 316 and 318 are provided with protective covers to prevent inadvertent activation.

A bulb 320 is activated when the contactors in the welding power supply have been closed and power is being supplied to the welding torches.

A button 322 is depressed to perform an arc voltage test. When this button is depressed, the contactors of the welding power supply close and the arc voltages for the torches are produced on displays 326 and 328.

The weld number 1 and weld number 2 arc voltages, for each pass, are adjusted by rotating potentiometers 330 and 332.

Referring to FIG. 7 there is illustrated schematically the positioning and rotation of the internal welders. Internal welders 336, 338, 340 and 342 are mounted on a drive ring 344. The motor 110 drives the ring 344 and the shaft position of the motor 110 is determined by the encoder 112. The position signal of the motor encoder 112 is transmitted to the encoder motor card 214 in the microcomputer control unit 92. This unit likewise produces the control signals for driving the motor 110. The motor 110 can drive the ring 344 in either a clockwise or a counterclockwise direction and can drive the ring at varying speeds.

Positions 346 and 348 define the top dead center and the bottom dead center positions on the pipe joint 32. Positions 350 and 352 define center points between the top dead center and bottom dead center points. Home location position 354 is defined to be slightly offset from the top dead center position. The welders 340 and 342 are offset 90 degrees from each other, as are the welders 336 and 338. However, welders 338 and 340 are less than 90 degrees apart.

There is also provided a mechanical stop 358 to open a limit switch on an internal welder if it should go beyond the desired stop position. This is a safety feature.

The hand-held unit 126 is used to define the home, start and stop positions. This is done while the operator has access to the panel 118. Through controls at this panel the operator can drive the ring 344 to position the internal welders. The operator drives the motor 110 to position welder 340 at each of the home, start and stop positions and when at the appropriate position, presses a corresponding button on the unit 126. The control unit 92 records each of the positions in a file for use in the automatic welding operation.

Briefly, in operation, the motor 110 drives the ring 344. When not welding, the ring is in a position so that the welder 340 is at the home position 354. The overall welding operation is carried out in two steps. The first step is a clockwise weld pass concurrently with welders 340 and 342 followed by a second weld pass in a counterclockwise direction using welders 336 and 338. It is desirable in this type of welding configuration to be operating in a downward moving direction.

In the first pass, the welder 340 is initially positioned at the home location 354. To begin the welding sequence, the gas supply and power supply contactor are turned on and the ring 344 is rotated to align the welder 340 at the start position 346 and the welder 342 at the position 352, or to continue the motion of the welders past these positions. At this location the wire feeders are started in the welders. An arc is then struck at both of the welders 340 and 342. When this occurs the drive motor 110 is either reactivated or continues to move the welders at a slow angular rate. Shortly after initiation of the weld pass, the motor 110 is commanded to increase the drive rate so that the welders 340 and 342 are proceeding along the weld pass at a high travel speed. As the welder 340 approaches the point 352 and the welder 342 approaches the point 348 the wire feed motor in each of the welders 340 and 342 is decelerated and the motor 110 is likewise decelerated to stop the welders at the termination positions. Concurrently with this, the gas supply is stopped and the contactor at the welding power supply is opened to terminate the weld power.

At this time the welder 338 has rotated to position 356. The sequence described above is repeated in a counterclockwise direction to complete the weld pass on the left side of the pipe junction. The rates for the travel speed, arc voltage and wire speed in accordance with the present invention ar illustrated in FIG. 17.

Figure 8:
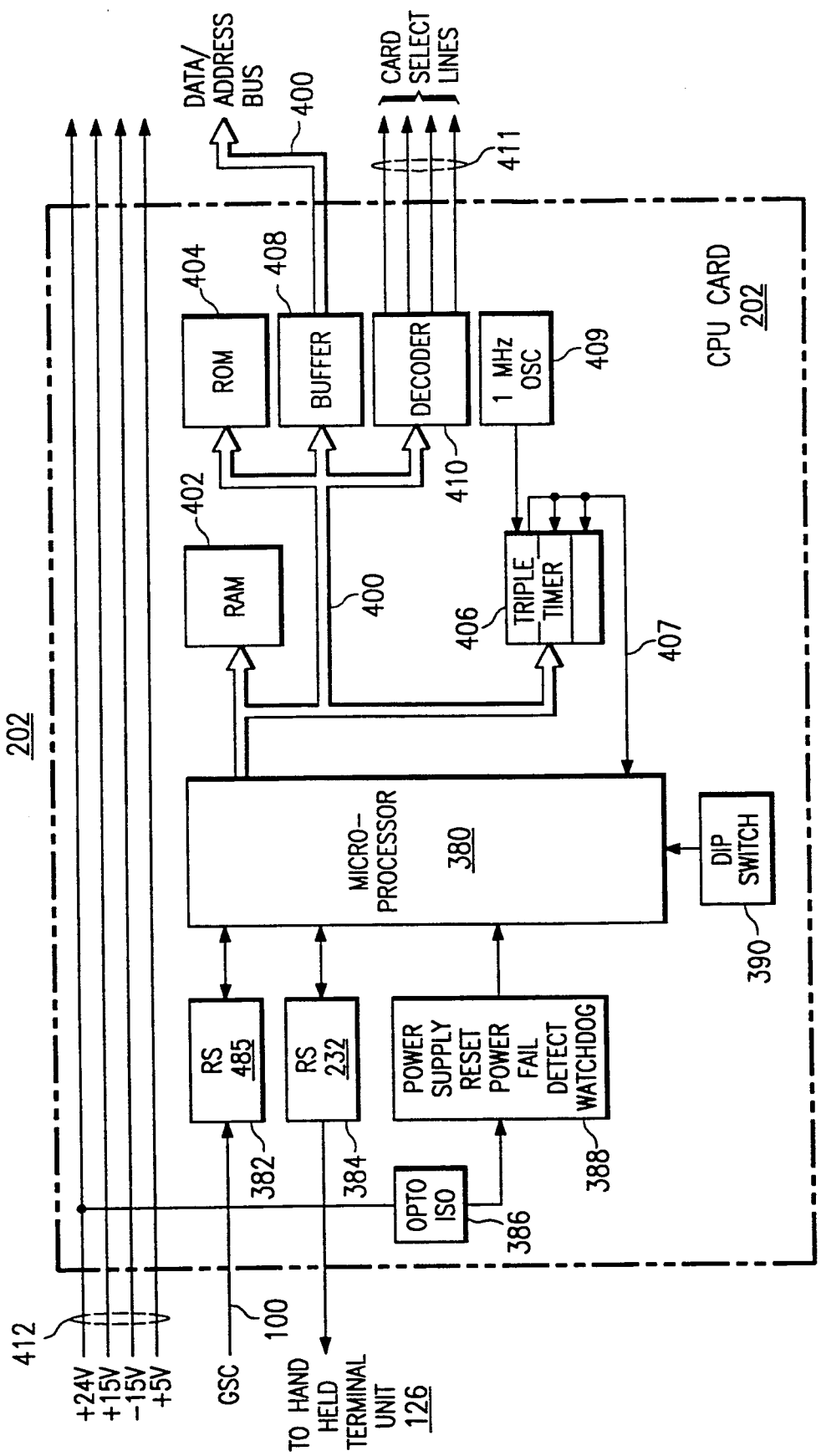
FIG. 8 is a detailed block diagram for the CPU card shown in FIG. 4.

A detailed block diagram for the CPU card 202 is illustrated in FIG. 8. The card 202 includes a microprocessor 380 which is preferable a model 80C152 made by Intel Corporation. The communication link 100, which is identified as GSC (Global Serial Channel) is connected through an RS485 circuit 382. An RS232 communication circuit 384 is likewise connection to the microprocessor 380 for connection to a hand held terminal 126, described below.

A twenty four volt power input to the card 202 is coupled through an optical isolator 386 to a power monitor circuit 388. The output of the circuit 388 is further connected to the microprocessor 380. A dip switch 390 is likewise connected to the microprocessor 380.

The CPU card 202 is provided with a parallel data/address bus 400 which connects the microprocessor 380 to a random access memory 402, read only memory 404, a triple timer 406, a buffer 408 and a decoder 410. An interrupt line 407 extends from the timer 406 to the microprocessor 380. An oscillator 409 provides a clock signal to the timer 406. The decoder 410 produces a group of card select signals on lines 411. The card select lines enable one external card at a time to communicate with the CPU card via the parallel data/address bus 400. An interrupt line 407 connects timer 406 to the microprocessor 380.

A group of power lines 412 are provided to the card 202 for providing plus twenty four volt, plus fifteen volt, minus fifteen volt, and plus five volt power.

Figure 9:
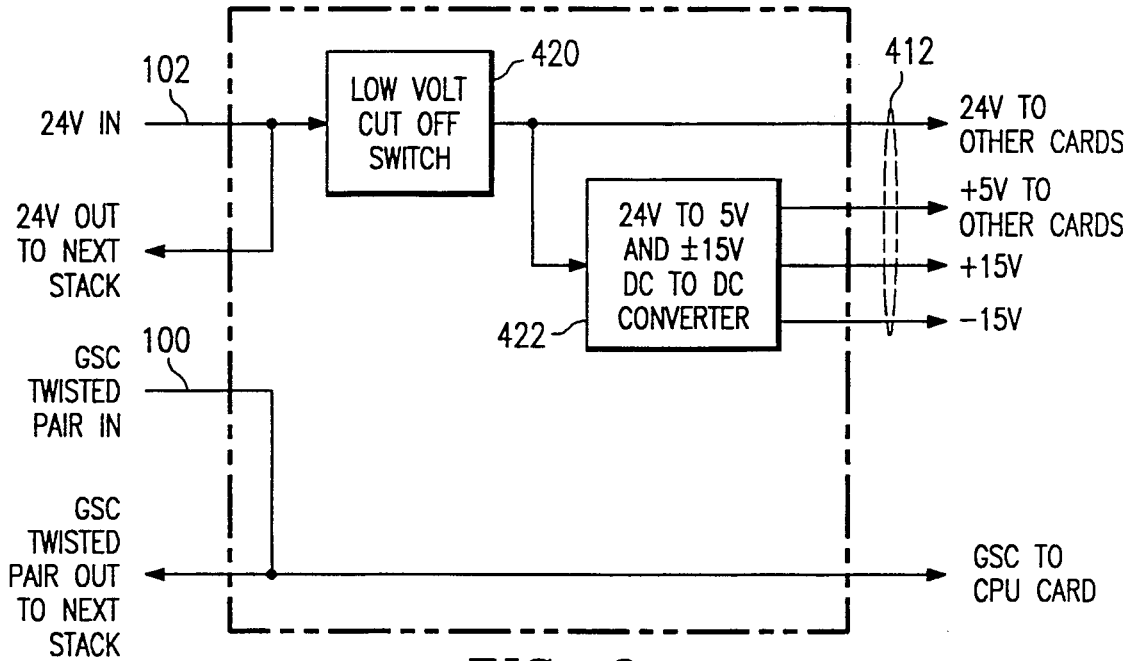
FIG. 9 is a detailed block diagram for the power supply card shown in FIG. 4.

A block diagram of the power supply card 204 is illustrated in FIG. 9. The 24 volt power line 102 from the battery 50 is connected to the card 204 and within the card to a low voltage cut-off switch 420. The communication link 100, a twisted pair, is connected to the card 204 and likewise extends outward from the card for connection to other control units. A further connection within the card 204 extends the line 100 to the CPU card within the corresponding control unit. The power line signal 102 passes through the switch 420 to a voltage converter 422 which produces five volts, plus 15 volts and minus 15 volts and these are provided together with the 24 volts from line 102 through a group of lines 412. These power lines are input to all of the other cards within each microprocessor control unit.

Figure 10:
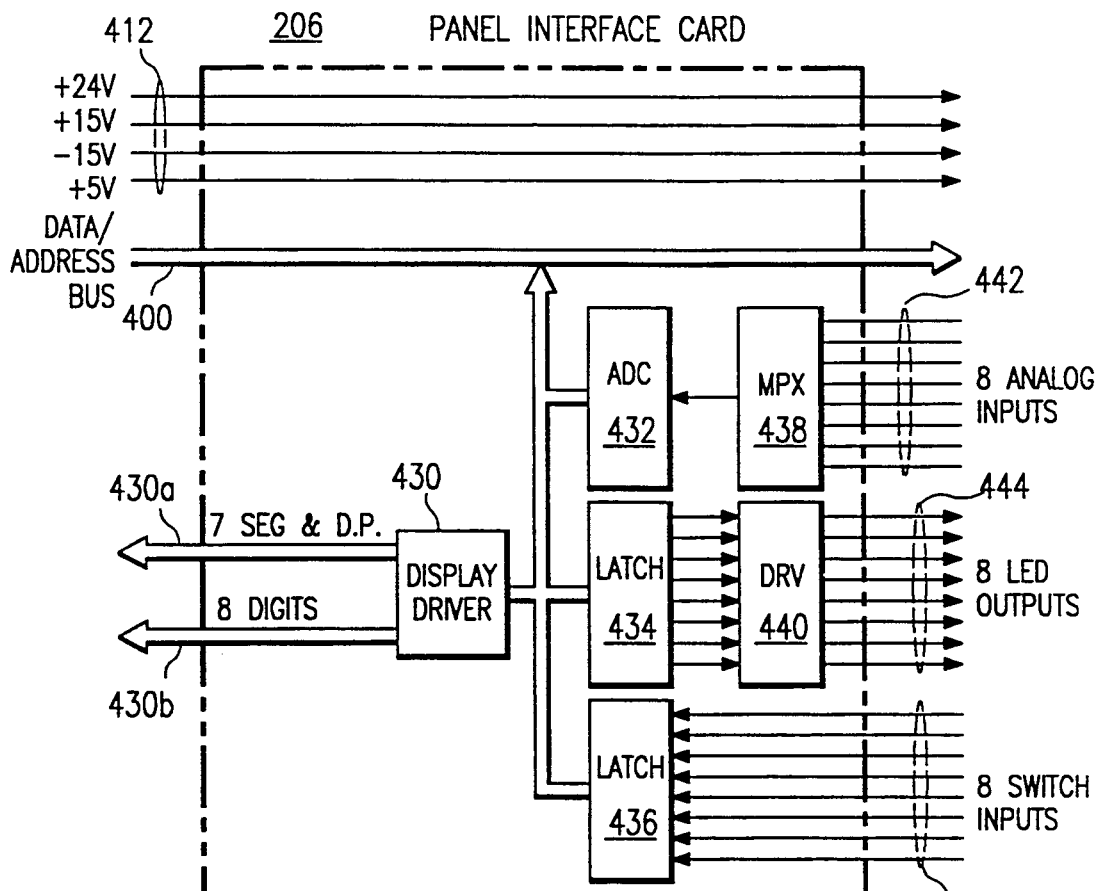
FIG. 10 is a detailed block diagram for the panel interface card shown in FIG. 4.

The panel interface card 206 is described in FIG. 10. The power lines 412 are likewise input to the card 206 to provide operational power for the card. The address bus 400 is also connected to card 206 from the CPU card 202. This bus extends to a display driver 430, an analog-to-digital converter 432, a latch 434 and a latch 436.

The display driver 430 provides drive lines 430a and 430b for producing displays at a panel, such as the panels 118 and 120 shown in FIGS. 5 and 6.

A group of analog input lines 442 from various sensors and switches are input to the multiplexer 438 which routes one of the inputs to the analog-to-digital converter 432. The analog signal at one of the input lines is then converted to a digital word which is transmitted through the bus 400 to the CPU card 202.

The latch 434 holds the state for a plurality of LED outputs. These states are input to a driver 440 which drives a group of LED output lines 444 that activate various ones of the LED lamps, or bulbs, on the display panels. The selection of which lamp to illuminate is determined by the microprocessor 380 which transmits an appropriate command through the bus line 400 to the latch 434.

A group of switch input lines 446 are provided to a latch 436 which stores the state of each switch input.

This is provided as a digital word to the bus 400 and transmitted back to the CPU card 202.

Figure 11:
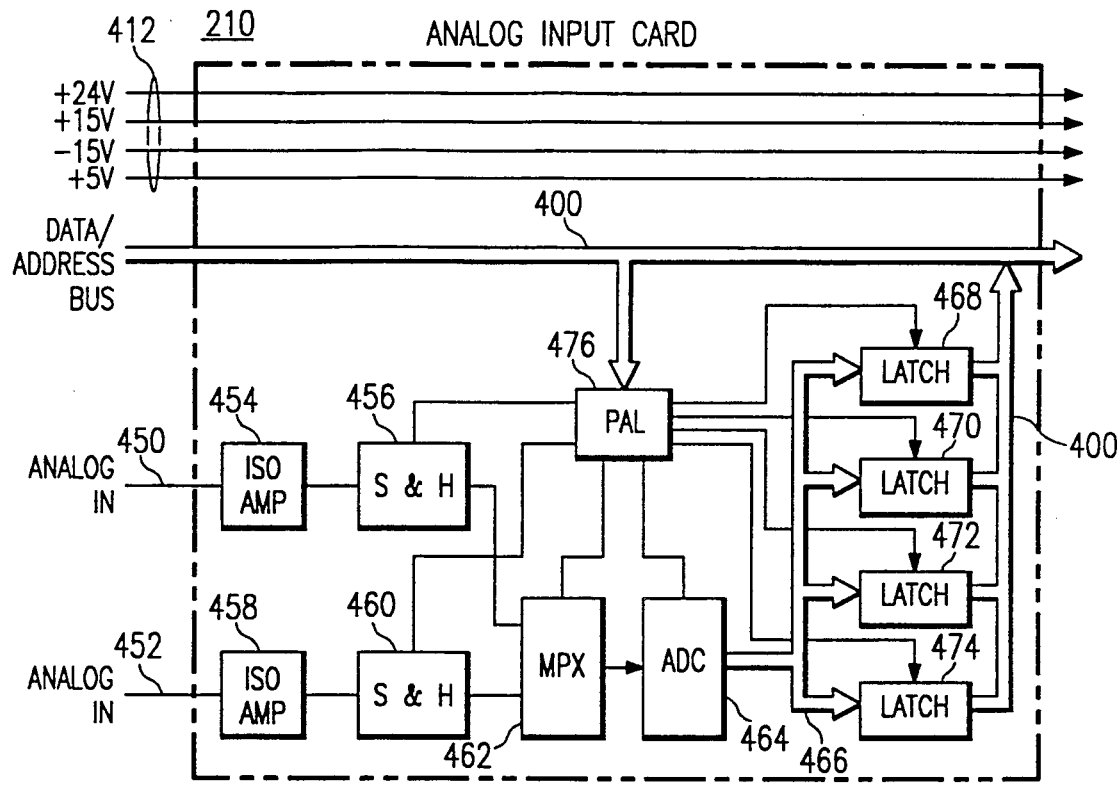
FIG. 11 is a detailed block diagram for the analog input card shown in FIG. 4.

The analog input card 210 is shown in a detailed block diagram in FIG. 11. This card receives the power lines 412 and the data/address bus 400. It further includes analog input lines 450 and 452. Line 450 is connected to an isolation amplifier 454 which transfers the input to a sample and hold circuit 456. Likewise, the signal at input line 452 is transferred through an isolation amplifier 458 to a sample and hold circuit 460. The outputs from the sample and hold circuits 456 and 460 are both provided to a multiplex circuit 462 which selectively provides an output to an analog-to-digital converter circuit 464. The output from the circuit 464 is transmitted through a bus 466 to latches 468, 470, 472 and 474. The output of each of these four latches is connected to the data/address bus 400.

The sequential operation of the sample and hold circuits 456 and 460 as well as the multiplex circuit 462, the analog-to-digital converter 464, and the latches 468-474 are controlled by a programmable array logic (PAL) circuit 476. Operation of the PAL is controlled by commands passed to it via the bus 400 from the CPU card.

In operation, the analog input card 210 receives analog signals on each of the input lines 450 and 452. These are the arc signals for the respective internal welders in operation at one time. These signals are sampled by the circuits 456 and 460 and these analog samples are alternately provided through the multiplexer circuit 462 to the analog-to-digital converter 464 which produces a respective digital word for each of the analog samples. These digital words are then stored in the latches 468-474 and transferred through the bus 400 to the CPU card of control unit 94. The CPU transmits the values via the GSC communication link 100 to the CPU in control unit 98 for the welding power supply. These digital words are then converted back to analog signals via analog output card 212. The output of card 212 controls the welding power supply output voltage to insure that the required welding voltage is maintained at each of the arcs.

Figure 12:
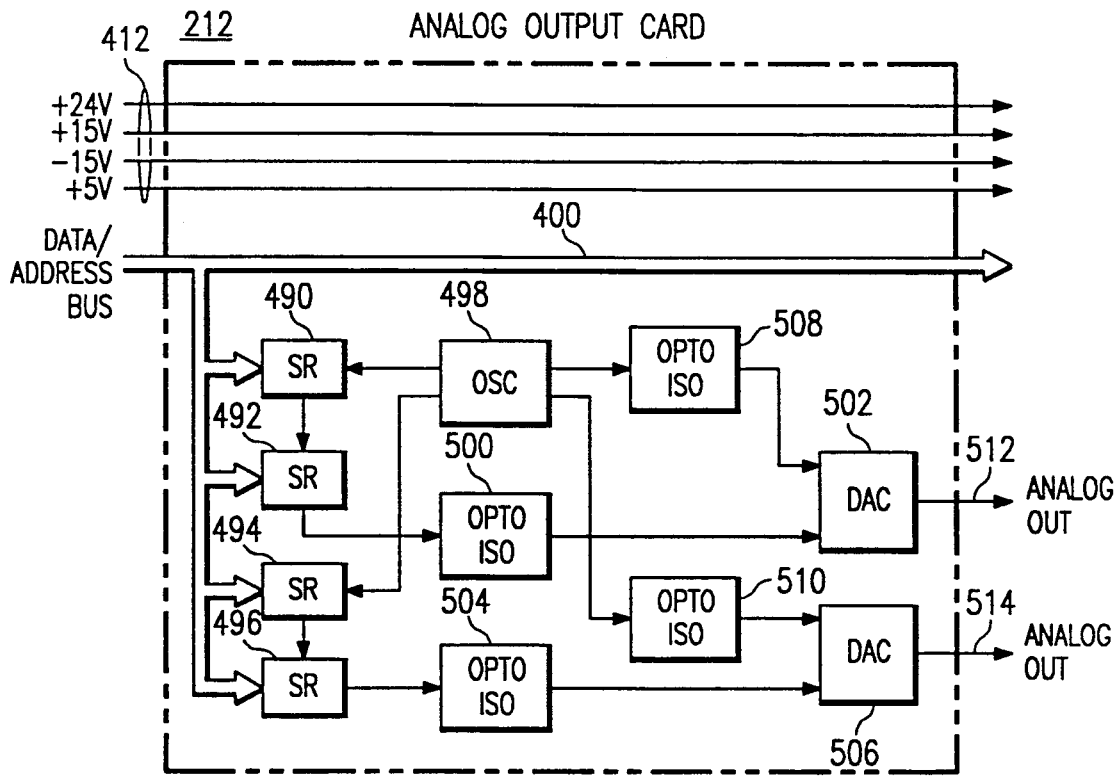
FIG. 12 is a detailed block diagram for the analog output card shown in FIG. 4.

The analog output card 212 is described as a block diagram in FIG. 12. The card 212 receives the power lines 412 as well as the data/address bus 400. Digital data words are transmitted through the bus 400 to each of a group of shift registers 490, 492, 494 and 496. An oscillator 498 provides a clock signal to the shift registers 490 and 494. The output from register 490 is transferred to the register 492 and the output from the register 494 is transferred to the shift register 496. The digital word in the shift register 492 is transferred through an optical isolator 500 to a digital-to-analog converter 502. The output of shift register 496 is transferred through an optical isolator 504 to a digital-to-analog converter 506.

The output from the oscillator 498 is likewise transferred through an optical isolator 508 to clock the operation of the digital-to-analog converter 502 and the output from the oscillator 498 is transferred through an optical isolator 510 to clock the operation of the digital-to-analog converter 506. The converter 502 produces an analog output signal at a line 512 and the digital-to-analog converter 506 produces an analog output signal at a line 514.

In operation, the card 212 receives the digital arc voltage words produced by the analog input card 210. These digital words are transferred through the shift registers 490-496, optically isolated and transformed by converters 502 and 506 into analog voltages that are utilized to control the arc power supply 104.

Figure 13:
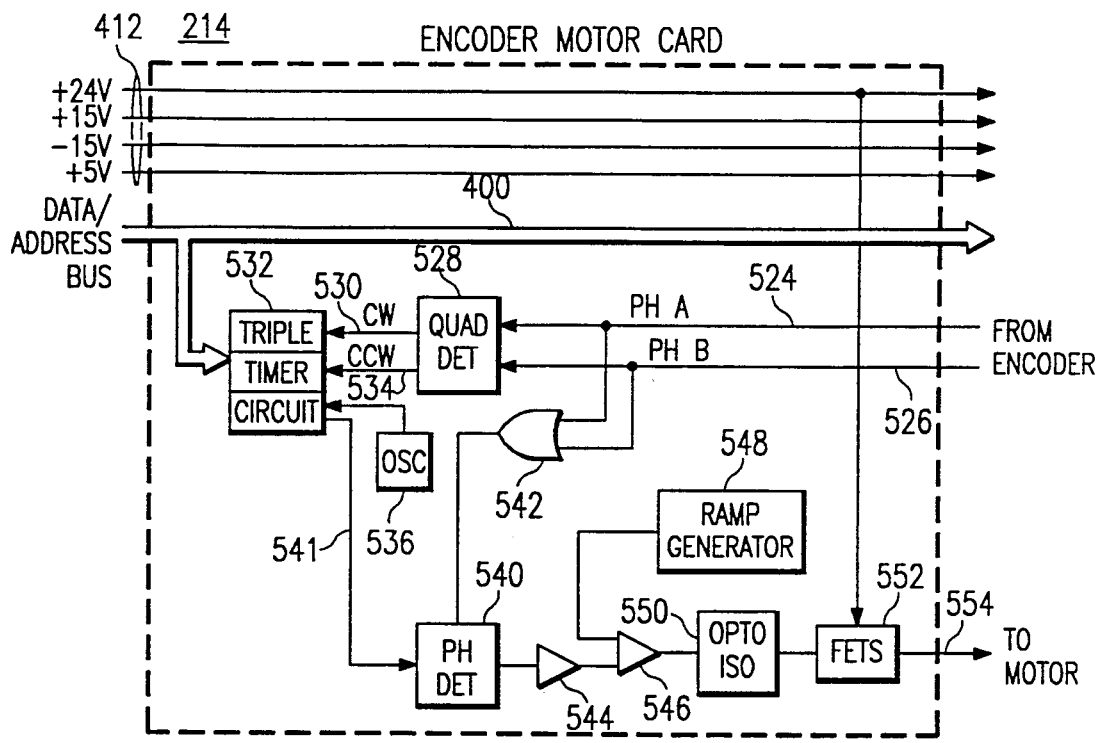
FIG. 13 is a detailed block diagram for the encoder motor card shown in FIG. 4.

The encoder motor card 214 is described in block diagram form in FIG. 13. This card has connected thereto the power lines 412 and the data/address bus 400. The encoder 112 for the motor 110 provides output signals on lines 524 (phase A) and 526 (phase B). The lines 524 and 526 are input to a quadrature phase detector circuit 528. The circuit 528 detects when there has been an incremental rotation of the wheel in encoder 112. A clockwise increment of rotation is indicated by a signal transmitted through a line 530 to counter No. 1 of triple timer circuit 532. A counterclockwise incremental movement of the encoder wheel is transmitted as a signal through the line 534 to counter No. 2 of triple timer circuit 532. The third counter of triple timer circuit 532 is used to divide a reference provided by the output from an oscillator 536. By reading counter 1 and counter 2 of the timer, the CPU is able to determine the rotary position of the motor encoder and, therefore, the rotary position of the ring 344. By writing numbers to the divide by counter, counter No. 3, the CPU is able to create varying pulse output rates which are input to a phase detector 540. A line 541 connects the counter No. 3 of the timer circuit 532 to the phase detector 540.

The encoder motor card 214 further includes a phase detector 540 which receives the output of an OR gate 542. The inputs to the gate 542 are the phase A and phase B encoder signals at lines 524 and 526. A further phase input to the detector 540 is the output of the triple timer circuit 532. The output of the phase detector 540 is passed through an amplifier 544 and provided to a first input of a comparator 546. A ramp generator 548 provides the second input to the comparator 546. The output from the comparator 546 is passed through an optical isolator 550 to provide a driver signal to drive field effect transistors 552. The transistors 552 produce a driver signal at a line 554 which is provided to drive the ring motor 110.

The circuit 214 provides a feedback control system for driving the motor 110 to accurately position the motor and govern its rate of travel. If the rate of pulses arriving from the encoder is greater than the reference output from the third triple timer, the output of the phase detector will go low. This will cause the output of the comparator to stay low so the FETS will not be turned on and the motor will slow down. If the rate of pulses from the encoder is too low, the output of the phase detector will go high causing the output of the comparator to go high, the FETs will be turned on and the motor will speed up. At a matched speed, the phase detector will produce a pulsed output whose average value will cause the comparator to deliver pulses to the FETs. The pulsed output from the FETs will provide the proper power to the motor to match the load.

Figure 14:
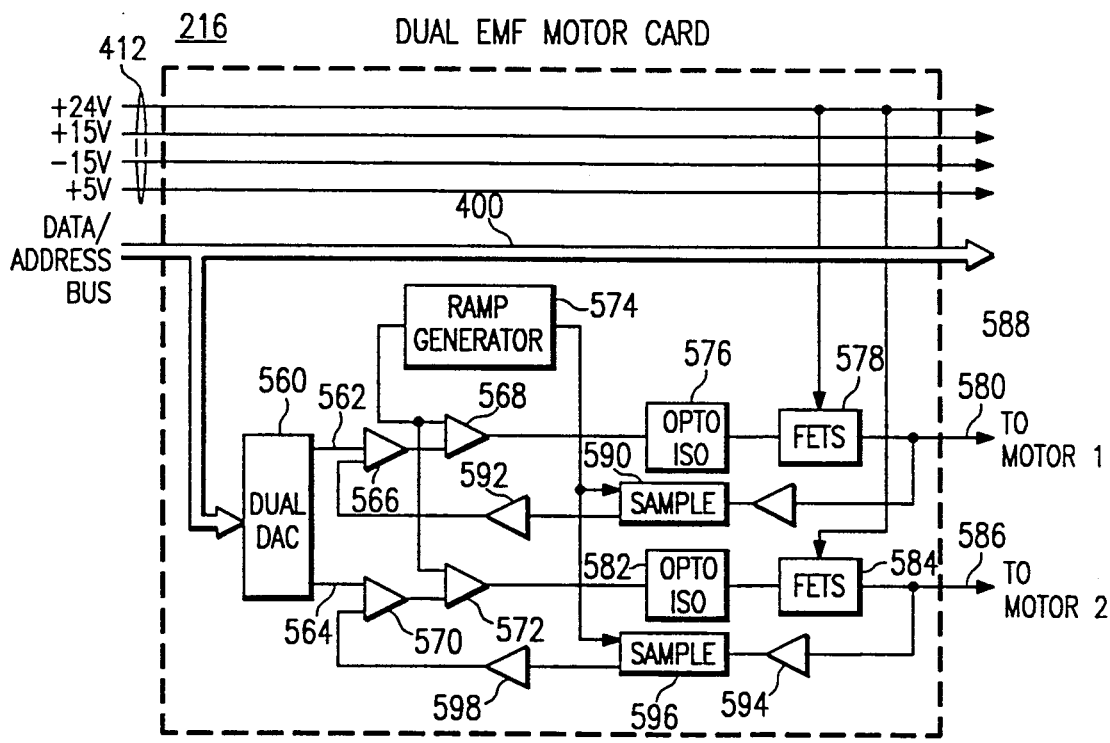
FIG. 14 is a detailed block diagram for the dual emf motor card shown in FIG. 4.

The dual EMF motor card 216 is described in a functional block diagram in FIG. 14. This card likewise receives the power lines 412 and the data/address bus 400. The bus 400 is connected to the input of a dual digital-to-analog converter 560. This converter receives digital words and generates analog signals from them at line 562 and 564. The analog signal at line 562 is provided to the first input of a comparator 566 which has the output thereof input to a comparator 568. The analog signal at line 564 is provided to the first input of a comparator 570 which has the output thereof provided to the first input of a comparator 572.

A ramp generator 574 generates a ramp signal which is provided to the second input of comparators 568 and 572. The output from comparator 568 is transmitted through an optical isolator 576 to a group of driver field effect transistors 578. The transistors 578 produce a wire feed drive signal at a line 580 which is provided to the wire feed motor number 1, such as for internal welder 340. The output of the comparator 572 is transmitted through an optical isolator 582 to a group of field effect transistors 584 which produces a motor driver signal at a line 586 for driving the wire feed motor number 2, such as for internal welder 342.

The line 580 also serves to monitor the back electromotive force (EMF) from the wire feed motor and provide this signal through an amplifier 588 to a sampling circuit 590. The sampled signal is provided through an amplifier 592 to the second input of the comparator 566. In a similar fashion, the back EMF signal from the wire feed motor number 2 is provided from line 586 through an amplifier 594 to a sampling circuit 596. The sampled signal is conveyed through an amplifier 598 to the second input of comparator 570.

Briefly, in operation, the card 216 receives a back EMF signal through a line, such as 580 and this signal is compared at the comparator 566 with the desired drive signal received through line 562. The difference produced by the circuit 566 is compared to a ramp signal received from the generator 574. The time duration of the output from the comparator 568 is a function of the amplitude of the signal at the output of the comparator 566. This drive signal is isolated by the optical isolator 566 and used as a driver for the field effect transistor 578. The motor is driven by pulses from the transistors 578. This circuit, as a whole, is a feedback control circuit which insures that the wire feed motors are driven at almost exactly the speed required and selected by a digital word which is input to the dual DAC 560 through the bus 400. The second motor is driven by similar circuitry.

Figure 15:
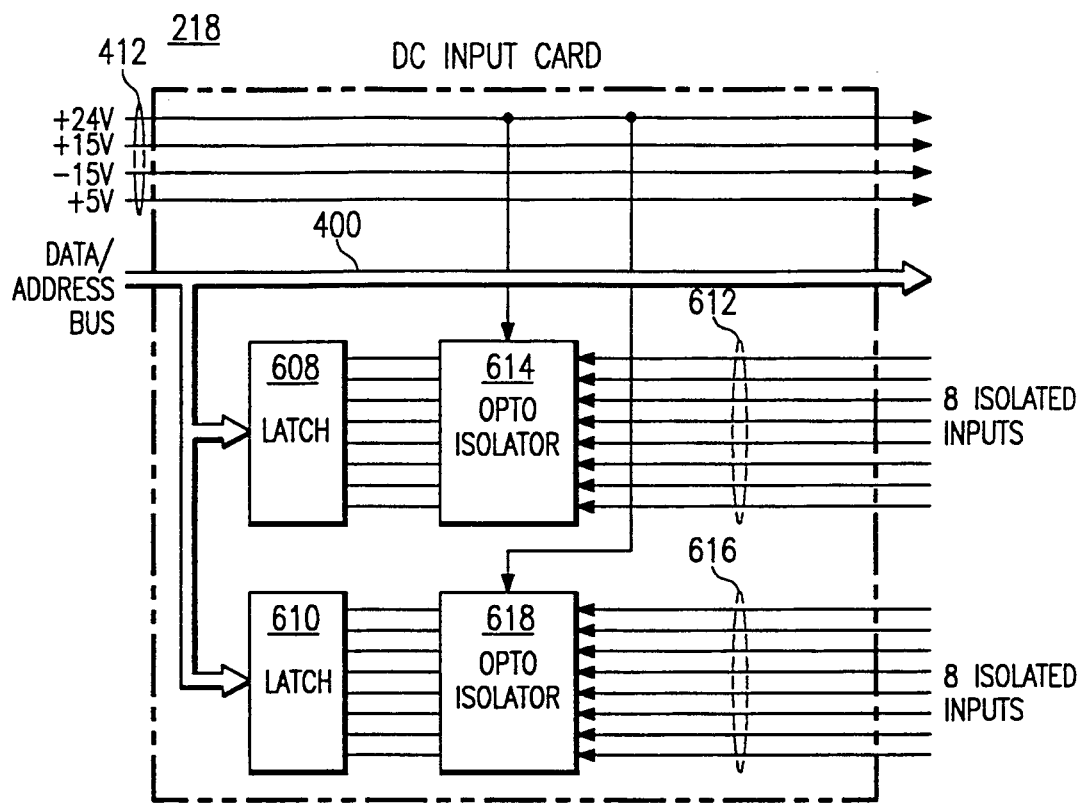
FIG. 15 is a detailed block diagram for the DC input card shown in FIG. 4.

The DC input card 218 is described in a block diagram shown in FIG. 15. Power lines 412 and data/address bus 400 are provided to the components on the card 218. Latches 608 and 610 are each connected to the data/address bus 400 for transferring digital words through the bus. A group of eight input lines 612 are provided to an optical isolator 614. The outputs from the isolator 614 are provided to the latch 608. A group of eight isolated inputs 616 are provide to an optical isolator 618. The outputs from the isolator 618 are likewise transferred to the latch 610. These inputs are inputs from switches. By reading the latches via data bus 400 the computer can determine which inputs are on and which are off.

Figure 16:
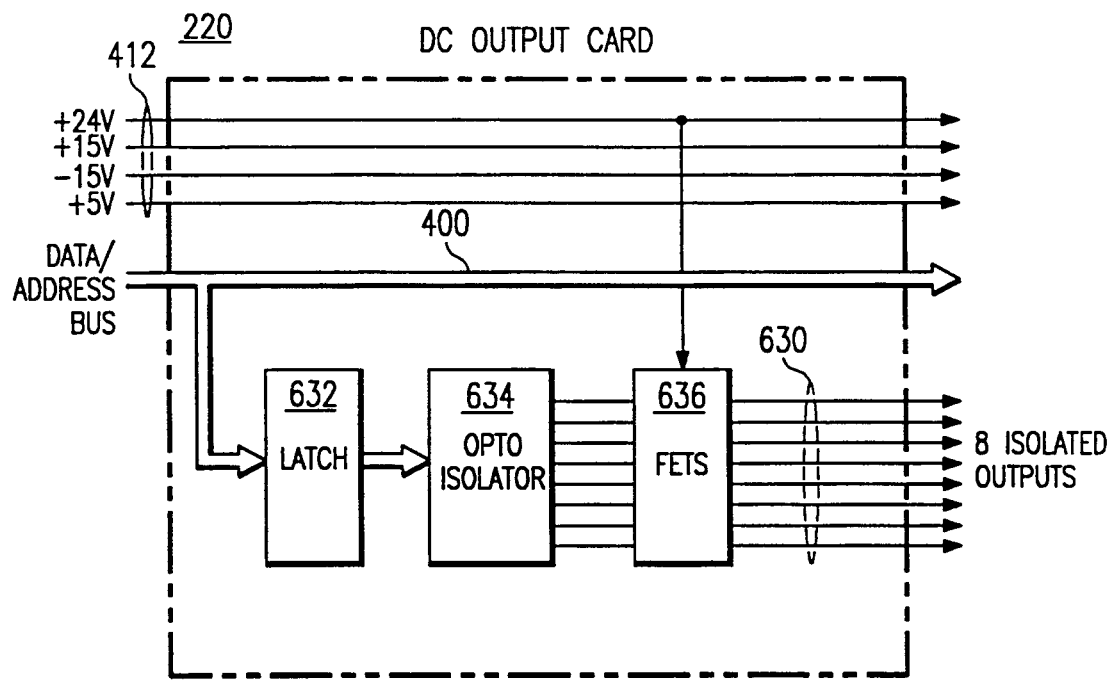
FIG. 16 is a detailed block diagram for the DC output card shown in FIG. 4.

The DC output card 220 is described in a functional block diagram in FIG. 16. The card 220 receives the power lines 412 as well as the data/address bus 400. The function of this card is to provide on/off signals at a group of eight isolated output lines 630. A latch 632 is connected to the bus 400 for receiving digital words therefrom. The digits received at the latch 632 are coupled through an optical isolator 634 to provide the eight on/off conditions for a group of field effect transistors 636. The transistors 636 function as drivers for each of the lines 630. These lines serve to drive the solenoids for clockwise gas, counterclockwise gas, the aligners, the front shoes, the wheels up, the wheels down, the brake, the travel forward, travel reverse, rear shoes expand, and read shoes retract.

The operation of the internal welders is now described in reference to FIGS. 7 and 17. The welders 336, 338, 340 and 342 are mounted on the ring 344 which is driven by motor 110. The angular position of the motor 110 is indicated by the encoder 112 which provides a pulse signal to the control system, further described below. Referring to FIG. 17, there is illustrated a chart which shows wire speed, arc voltage and travel speed for a representative weld pass. In operation, one weld pass is made in the clockwise direction and another in the counterclockwise direction.

As shown in FIG. 7, the internal welders 340 and 342 are used in the clockwise welding operation for the right half of the weld pass for the pipeline joint. The ring 344 is rotated to bring the internal welder 340 to the top position 346 and thereby bring the internal welder 342 to the position 352. The ring is rotated 90 degrees for the clockwise welding pass.

The ring 344 is positioned to have welder 338 at position 346 for a counterclockwise welding pass. The ring 344 is rotated for one-quarter circle in the counterclockwise direction to complete the welding pass on the left hand side of the pipe joint.

In a first method of operation, the ring 344 is driven by the motor 110 to position the internal welder 340 at the home position 354. Each of the welders 340 and 342, during the welding pass, feeds an electrode wire into the gap at the pipe joint for the welding pass. The speed that this wire is provided to the gap is shown as line 644 in FIG. 17. The arc voltage which is applied to each of the wires is illustrated as line 646. The travel speed for the internal welder is illustrated as line 648.

In a preferred embodiment, the wire speed starts at a speed of 240 inches per minute (IPM) and ramps up to a maximum speed of 550 IPM. the arc voltage begins at a level of 19.0 volts and ramps up to a level of 21.0 volts. Travel speeds for the internal welder start at zero for one embodiment, and ramps up to 55 inches per minute (IPM) for a travel speed across the majority of the weld pass. For a moving start, the travel speed is 20 inches per minute.

In the operation of a control system described in more detail below, the internal welder 340 is positioned at the home position 354 and a button on a hand-held training unit 126 is pressed to define this position as being the home position. The ring 344 is then rotated by operation of the motor 110 to position the internal welder 340 at the position 346. A button on the hand-held training unit 126 is then pressed to define this as the start position for the welding pass. The ring 344 is then rotated in the clockwise direction to position the internal welder 340 at position 352 and a button on the hand-held training unit 126 is depressed to define this as the stop position for the automatic welding pass. This same operation is conducted to establish the start and stop positions for the counterclockwise welding pass with reference to the internal welder 338.

To perform the welding operation, the internal welder 340 is positioned at the home position 354. At that point, the automatic sequence of welding is initiated. In one embodiment, the automatic welder is then repositioned and stopped at the position 346. At this point the wire feed, for the electrode feed wire, is initiated at the rate noted above. The flow of shielding gas is also started. The arc is struck and an arc voltage of 19.0 volts is maintained. Concurrently, the internal welder 340 is started along the pass and accelerated through a ramp-up speed increase until the final travel speed of approximately 55 IPM is reached. Concurrently while increasing the travel speed, the wire speed is increased to the high speed rate of 550 IPM and the arc voltage is ramped up to a maximum of 21.0 volts. The ramp up time for the described embodiment is approximately 4 seconds. The high speed travel is maintained for approximately 85 percent of the welding pass. As the internal welder 340 approaches the position 352, the motor 110 is dynamically braked to slow it down as fast as possible. Concurrently, the wire speed is slowed to a stop and the arc voltage is reduced to zero. The gas flow is stopped. Thus, when the internal welder 340 becomes stopped at the position 352, all the parameters for wire speed, arc voltage and travel speed are at zero. The ramp-down of these parameters at the end of the weld pass is done very quickly. The down ramps shown in FIG. 17 are expanded to show the stopping operation.

The operations carried out by the internal welder 342 are the same as those for the internal welder 340, described above. The internal welder 342 travels from the position 352 to the final position 348. The wire speed, arc voltage and travel speed for the internal welder 342 is virtually the same as that for the internal welder 340.

In an optional method of operation, the internal welders 340 and 342 follow the travel speed shown by the solid line segment 650 illustrated in FIG. 17. This is termed a "flying start." In this method of operation, the internal welders 340 and 342 are ramped up to an initial speed, approximately 20 IPM, after leaving the home position 354 for the welder 340. As the internal welder 340 passes the position 346, the wire feed is initiated at the speed indicated. Upon reaching the position 346, and initiating the arc, the wire speed is ramped up, the arc voltage is ramped up and the travel speed for the internal welder is ramped up as shown in FIG. 17. From this point on to the termination of the weld pass, the conditions are the same as described above.

After the clockwise weld pass has been made as described above, the internal welder 338 is positioned at position 356. From this point, the welding operation in the counterclockwise direction is carried out in the same manner as described above for the clockwise welding pass. In this case, the internal welder 338 may be moved to the start position 346 and stopped or it may proceed and continue moving past the position 346 in a "flying start." In the same manner as described above, the internal welder 336 tracks the operation of the welder 338 so that one-half of the welding pass is completed in the counterclockwise direction by use of two welders.

Although four internal welders are shown in reference to FIG. 7, more such internal welders may be used concurrently. For a larger pipe, it is practical to use, for example, six or eight internal welders in one system.

The control system operation for the internal welders to carry out the functions shown in FIG. 17 are described in more detail below in the flow diagrams for the operations of the microprocessor control units.

The control system for the internal welder unit 30 comprises a distributed group of individual processors interconnected by a serial communication link 100. These are microprocessor control units 92, 94, 96 and 98. All of the software for the unit 30 control system is stored in each of the read only memories 404 in each of the computer cards 202. When there is any change in the software, an entire new software package is installed in each of the CPU cards 202. This substantially reduces the complexity in handling multiple processors and eliminates the possibility of installing the wrong software in a CPU card. The commonality of the cards in the control system permits interchange of the same card from one location to another and reduces the inventory required for replacement parts.

Each of the microcomputer control units 92, 94, 96 and 98 includes a CPU card 202. In the following software description, the term "CPU" refers to the CPU card.

Referring now to FIG. 18, there is illustrated the initial operational steps of the program upon each of the CPU cards 202. The program begins with a power on start 650. In a first operational block 652, the microprocessor reads the CPU type switch 390 to determine the CPU type for the CPU card. There are four CPU types, 1, 2, 3 and 4. The microcomputer control unit 92 is CPU type 1, control unit 94 is CPU type 2, control unit 96 is CPU type 3 and control unit 98 is CPU type 4.

Following block 652, the program enters operational block 654 which reads the PROM tables in the PROM 404, as well as the CPU type from the switch 390 to build a set of input/output addresses. This table defines the address for each function in the system. For example, if CPU type 1 is identified and that unit needs to turn on a set of wire feeders for a torch, the table identifies that the wire feeder function is located in CPU type 2. Thus, if the command is entered to CPU type 1 to activate the wire feeder, then CPU unit type 1 knows to send a command for that operation to CPU unit type 2. This is done by using an appropriate address for CPU unit number 2. The CPU card also identifies what functions it has individually so that these are addressed directly rather than through the communication link 100.

In the next operational block 656, the CPU type number is utilized to generate a set of global serial channel (GSC) addresses for each of the other microprocessor control units. This also permits the operating CPU card microprocessor to determine its own GSC address so that it will know which commands and data to receive. Other addresses are ignored.

Following operational block 656, the program enters an operational 658 to start the timer running. This is the timer 406 in CPU card 202. The timer 406 interrupts the microprocessor 380 every one quarter of a millisecond. The software can be set to perform a function on every n number of interrupts. In a question block 660, an inquire is made to determine if the time has arrived for a high-speed digital acquisition (HSDAQ). This occurs once every periodic interrupt, such as, at the 8 interrupt. This equates to a two millisecond interval. If this time has elapsed, the yes exit is taken to a question block 662 where in inquiry is made to determine if the operating processor is a CPU type 2. If this is true, the yes exit is taken to an operational block 664 which generates a command to read the analog-to-digital converters in the analog input card 210 associated with the operational microprocessor control unit.

After the digital samples have been produced, these values are transmitted from unit 94 to unit 98 via the GSC link 100 and from the microprocessor 380 in unit 98 via the bus 400 to the analog output card 212. This is done by providing an appropriate address for this card.

Figure 19:
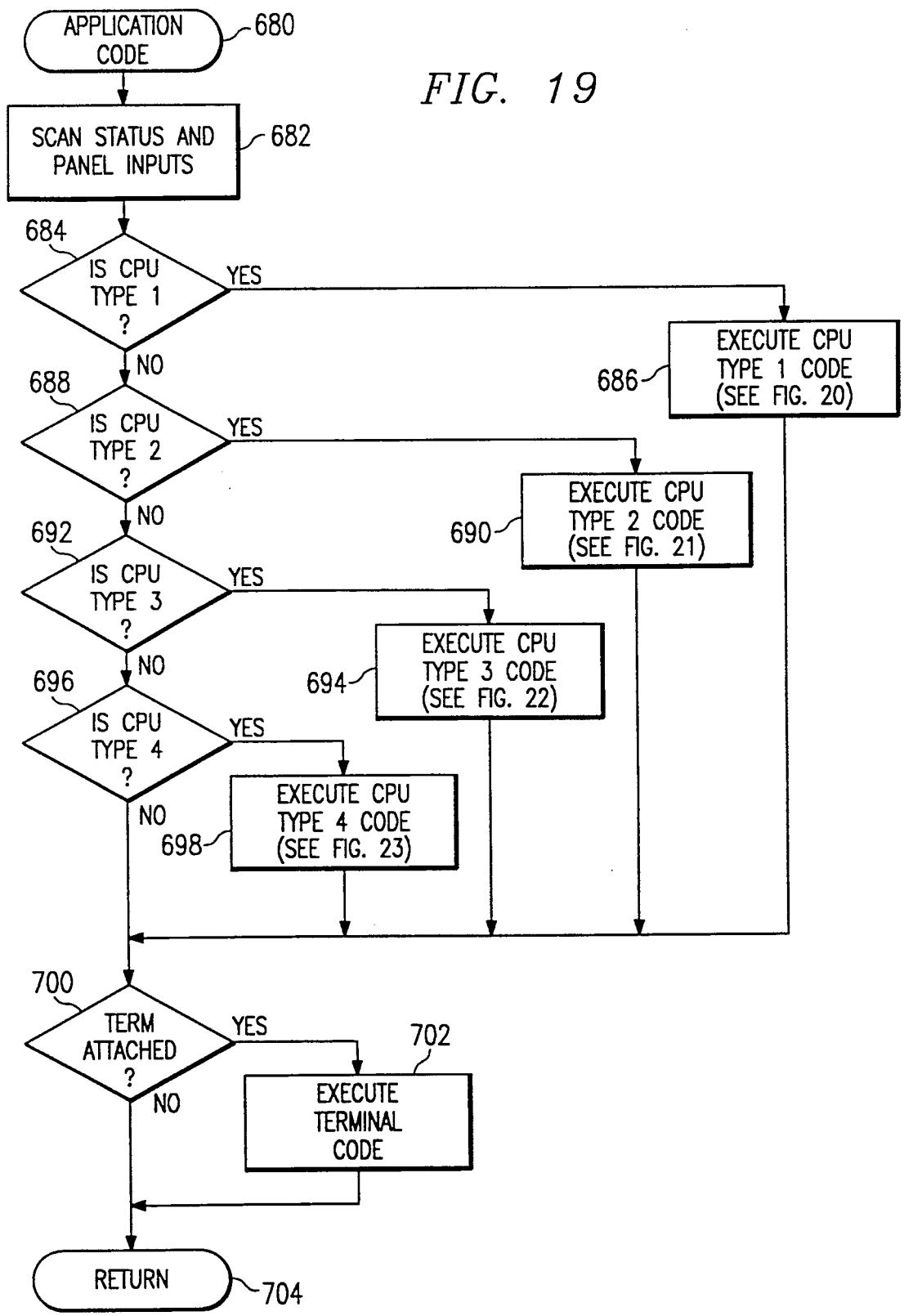
FIG. 19 is a flow diagram illustrating the operation of selecting the application operations for each of the CPUs.

The no exits from the question blocks 660 and 662 as well as the output from the operational block 666 enters a question block 668. Within this question block, an inquiry is made to determine if a timer sequence has been reached which requires scanning the inputs to the operating microprocessor control unit to determine if there are any inputs which require functional operations. This occurs at a periodic time as well. This is done on a 100 millisecond interval, that is, every 400 timer interrupts. This is tracked by the second counter in the triple timer 406. If the response question block 668 is yes, an operation block 670 is entered to execute the appropriate application code which is shown in FIG. 19. If the response to the inquiry in question block 668 is zero, the no exit is taken which returns control to the input of the question block 660 to again initiate the checks of the timers to determine what operation should be accomplished.

It must be noted that whenever a command or data is received by one of the microprocessor control units through the communication link 100, that communication receipt causes an interrupt which causes the microprocessor to perform the function required by the received command or data.

The code for the operations shown in FIG. 18 is listed below. The code for each of the other flow diagrams is listed following the description. These are in the C language, which is a programming language well known in the industry. The specific application operations such as, for example, "READ A/D CONVERTERS", is preferably written i the machine language for the selected microprocessor. The particular machine language routines can readily be prepared by one skilled in the art.

```
/*
    DANAL.C
*/
/*  Common DANAL data */
extern int CPUTYPE;
extern char RESTARTIP;
void danal ( )
{
/* The function of the data analysis task in this location    */
/* is to call on assembly language programs to configure      */
/* the stack of cards as a Back End, Front End, Reach Rod     */
/* Control Box, or Power Supply Junction box, to set up the   */
/* global serial communications channel addressing, to        */
/* initialize all system variables, and to start the system   */
/* interrrupt timer. */
    if (RESTARTIP)      /* If this is a power on restart      */
    {
        config (CPUTYPE);    /* Make sure the correct types of
                                input and output cards are at-
                                tached for this type of CPU.
                                (Back End, Front End, etc.) */
        gscinit (CPUTYPE);   /* Set up the global serial addresses
                                that this CPU will respond to. */
        sysinit (CPUTYPE);   /* Perform all other system
                                initialization */
        timerinit ( );       /* Start the system interupt timer */
    }
    if (RESTARTIP)           /* If this is a power on restart */
        RESTARTIP = 0;       /* clear RESTARTIP flag */
}    /* end of danal */
void systeminterrupt ( )
{
    /* When the timer causes an interrupt, this routine checks to
       see if it is time to transmit a digitized sample of the arc
       voltages and checks to see if it is time to scan the
       system inputs. */
    BASE_HS_DAQ += 1
    if (BASE_HS_DAQ > 4)
    {
        BASE_HS_DAQ = 0;
        if (CPUTYPE = 2)
        {
            readanalogs ( );
            xmitanalogs ( );
        }
```

-continued

```
    }
    BASE_SCAN_INP += 1;
    if (BASE_SCAN_INP > 400)
    {
        BASE_SCAN_INP = 0;
        danal0 (CPUTYPE);
    }
}    /* end of systeminterrupt */
```

The application code indicated by operational block 670 in FIG. 18, is shown in FIG. 19. This application code is entered at a start 680. In a first operational block 682, the system scans status and panel inputs. The two cards that provide inputs are the panel interface card 206 which has eight analog inputs and eight switch inputs and the DC input card which has a possible total of 16 DC isolated inputs. These DC signals are from sources such as limit switches, pressure switches and the five buttons on the hand-held training unit 126. The DC input card 218 is present only in CPU type 2. The panel interface card 206 receives inputs from the front end control panel 118 in unit 94, and from the reach rod control panel 120 in the unit 96. Whenever there is an input to any of these signals, there is a specified output. For example, if the toggle switch 230, shown in FIG. 5, is switched to the up position, the aligners 58 (shown in FIG. 3) are elevated.

In the next series of inquiries, shown in FIG. 19, the operating software determines its CPU type and executes the corresponding application code.

In a question block 684, an inquiry is made to determine if the CPU is type 1. If the response is yes, an operation block 686 is entered to execute the CPU type 1 code shown on FIG. 20.

If the response to question block 684 is no, the system enters a question block 688 to determine if the CPU type is 2. If the response to question block 688 is "yes", entry is made to an operation block 690 to execute the CPU type 2 code shown in FIG. 21.

If the response to the question block 688 is "no", entry is made to a question block 692 to determine if the CPU is type 3. If true, the yes exit is taken to an operation block 694 to execute the CPU type 3 code shown in FIG. 22.

If the response to the question block 692 is negative, entry is made to a question block 696 to determine if the CPU is type 4. If yes, the system enters an operation block 698 to execute the CPU type 4 code, which is shown in FIG. 23.

If the response in question block 696 is no, entry is made to a question block 700. The outputs from the operation block 686, 690, 694, and 698 likewise enter the question block 700. Within the question block 700 an inquiry is made to determine if a terminal is attached to the CPU. Such an attachment is made through the RS232 circuit 384. If such a terminal is attached, the yes exit is taken from block 700 to enter an operation block 702. At this point, the system executes the terminal code. Following block 702, the system goes to a return 704. This return is back to the entry into question block 660, shown in FIG. 18.

As shown in FIG. 19, all of the execution code required for each of the four types of processors are available for use by each microprocessor. It is this technique that permits the same collection of software to be used in each of the microprocessors without differentiating between one microprocessor and another. The differentiation is carried out in the software which reads the dip switch setting on the CPU card 202.

The code for FIG. 19 is listed below.

```
/*
   DANAL0.C
*/
/* Common DANAL data */
extern char Q_TERM_ATTACHED;
void danal0 ( )
{
/* The function of the data analysis task in this location */
/* is to scan the input cards and then run the appropriate */
/* routine based on the CPUTYPE. Before exiting, this code */
/* checks to see if the Q-Term is attached and, if it is,  */
/* calls on the Q-Term code. */
   scan_panels ( );
   scan_dc_inputs ( );
   switch (CPUTYPE)
   {
      case 1:   /* If the CPUTYPE == 1 */
         danal1 ( );   /* Execute the code for the Back
                          End Controller */
         break;
      case 2:   /* If the CPUTYPE == 2 */
         danal2 ( );   /* Execute the code for the Front
                          End Controller */
         break;
      case 3:   /* If the CPUTYPE == 3 */
         danal3 ( );   /* Execute the code for the Reach
                          Rod Control Box */
         break;
      case 4:   /* If the CPUTYPE == 4 */
         danal4 ( );   /* Execute the code for the Power
                          Supply Junction Box */
         break;
      default;
         break;
   }
   if (Q_TERM_ATTACHED)
      opter ( );   /* Execute the opterator interface routine */
}  /* end of danal0 */
```

Figure 20:
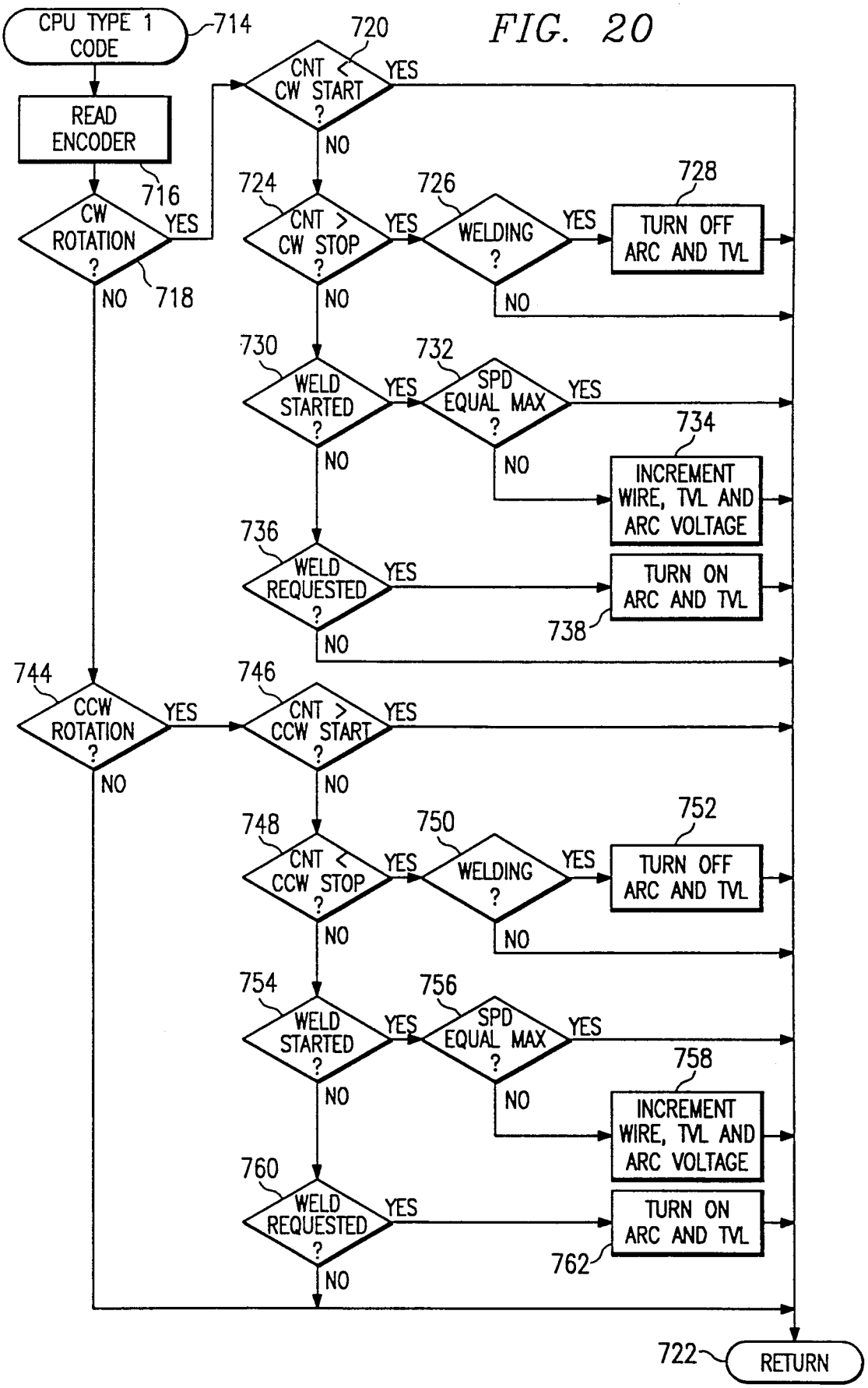
FIG. 20 is a flow diagram illustrating the operation of the CPU 1 applications.

The execution code for a type 1 CPU is illustrated in FIG. 20. As noted above, the type 1 CPU is within the microprocessor control unit 92 at the internal welder backend control unit. The control unit 92 directly controls the motion of the torches 336, 338, 340 and 342 and indirectly controls the operation of the torches and power supply contactors. It is this microprocessor control unit that accomplishes the functions for wire speed, arc voltage and travel speed illustrated in FIG. 17.

The CPU type 1 code begins with a start 714. Next, it enters an operation block 716 to read the encoder 112. This is done through the encoder motor card 214 which receives the encoder signal via lines 524 and 526. Previous to this point in the operation, the system has been "trained" and various positions, shown in FIG. 7, have been stored in the program. These are home position 354, the clockwise start position 346, the clockwise stop position 352, the counterclockwise start position 346, and the counterclockwise stop position 350.

From the operation block 716, the program enters a question block 718 to determine if the torches are rotating clockwise. If so, the yes exit is taken to a question block 720. Within the block 720, a check is made of the encoder count to determine if it is less than the clockwise start position. If so, the torch is not in the appropriate position to start a weld and the yes exit is taken to a return 722. This return takes the system back to the input of question block 700 in FIG. 19.

If the response in the question block 720 is no, entry is made to a question block 724 to determine if the encoder count is greater than the clockwise stop position. If this is true, the yes exit is taken to a question block 726 to determine if welding is in progress. If welding is being performed, then the stop position has been reached and it must be terminated The yes exit is taken from block 726 to an operation block 728 which causes the arc and torch travel to be terminated. Following block 728, the system enters the return 722.

If welding has not been commenced, as determined in question block 726, the no exit is taken to the return 722.

In reference to question block 724, if the encoder count is less than the clockwise stop position, the no exit is taken to a question block 730. Within the block 730, an inquiry is made to determine if the weld has started. If so, the yes exit is taken to a question block 732. This block determines if the speed of the wire and torch travel is at the maximum value and if the arc voltage is at the maximum value. If so, the yes exit is taken to the return 722. If no, the system enters an operation block 734 to increment (increase) the wire speed, travel speed and arc voltage. This step of increasing speed corresponds to the upward ramp for the wire speed and travel speed shown in FIG. 17. Following the operation block 734, the system enters the return 722.

If the response in the question block 730 is negative, that is, the weld is not started, the no exit is taken to a question block 736 to determine if a weld has been requested. Such a request is made by monitoring the weld start button 306, shown in FIG. 6. This signal is transferred to the operating microprocessor through one of the panel interface cards 206, as described above. If a weld has been requested, the yes exit is taken from the question block 736 to an operation block 738 which turns on the wire feed for each of the internal welders 340 and 342 and the welding power supply contactors. Following block 738, the system enters the return 722. If no weld has been requested, the no exit is taken from question block 736 to the return 722.

As shown in the top half of FIG. 20, for clockwise torch rotation, these steps provide the ramp up for the parameters, the travel to the end of the weld pass, at which point the welding parameters are terminated.

The lower half of FIG. 20 provides an identical set of operations for a counter clockwise rotation. The question block 718 determines if the torches are rotating counterclockwise. If not, the no exit is taken to question block 744 to determine if counterclockwise rotation has been requested. If the answer is no, the system enters the return 722. If the answer is yes, the system enters a question block 746. The block 748 determines if the encoder count is greater than the counter-clockwise start number. If yes, the system enters the return 722. If no, the system enters a question block 748. From question block 748, there are provided question block 750, operation block 752, question block 754, question block 756, operation block 758, question block 760 and operation block 762. Blocks 746–762 correspond respectively to blocks 720–738, described above in reference to FIG. 20.

The C code for FIG. 20 is listed below.

```
/*
   DANAL1.C
*/
/* Assembly routine - Located in ENCODER1 */
extern int rdencoder( );
#include <danal.def>
#include <input1.def>
void danal1 ( )
```

-continued

```
{
/* On every pass, 10 times / second, update enccount by invoking */
/* rdencoder ( ). This routine returns a new value of enccount. */
rdencoder (enccount);
/* Check to see if the cw_rotate of ccw_rotate system status */
/* bits are set. If they are, invoke the cw or ccw start/stop tests. */
if (systemstatus & cw_rotate)
{
    if !(enccount < cwstart)
    {
        if (enccount > cwstop)
        {
            if (welding)
            {
                turnoff (weld_contactor1);
                turnoff (weld_contactor2);
                turnoff (CW_wirefeed 1);
                turnoff (CW_wirefeed 2);
                turnoff (ring_travel);
            }
            else if (welding)
            {
                if !(tvlspeed > maxtvl)
                {
                    tvlspeed += 1;
                    CW_wirspeed1 += 1;
                    CW_wirspeed2 += 1;
                }
            }
            else if (start_weld)
            {
                turn on (weld_contactor 1);
                turn on (weld_contactor 2);
                turnon (CW_wirefeed1);
                turnon (CW_wirefeed2);
            }
        }
    }
}
else if (systemstatus & ccw_rotate)
{
    if !(enccount < ccwstart)
    {
        if (enccount > ccwstop)
        {
            if (welding)
            {
                turnoff (weld_contactor1);
                turnoff (weld_contactor2);
                turnoff (CCW_wirefeed 1);
                turnoff (CCW_wirefeed 2);
                turnoff (ring_travel);
            }
            else if (welding)
            {
                if !(tvlspeed > maxtvl)
                {
                    tvlspeed += 1;
                    wirspeed1 += 1;
                    wirspeed2 += 1;
                }
            }
            else if (start_weld)
            {
                turnon (CCW_wirefeed 1);
                turnon (CCW_wirefeed 2);
                turnon (CCW_wirefeed1);
                turnon (CCW_wirefeed2);
            }
        }
    }
}   /* end of danall */
```

The operation code for the type 2 CPU is described in reference to FIG. 21. As noted above, the type 2 CPU is in the microprocessor control unit 94 which is at the front end of internal welder unit 30. This CPU card, in the front end control unit, controls many of the mechanical functions within the internal welder unit 30. It does so in response to commands that are received from both the panels 118 and 120, which are shown in FIGS. 5 and 6 respectively. The commands from the panel 118 are received directly at the microprocessor control unit 94 via its panel interface card 206. However, the commands from the reach rod control panel 120 are input to the microprocessor control unit 96 via its corresponding panel interface card 206 and then transmitted by the control unit 96 via the communication link 100 to the CPU card 202 for the microprocessor control unit 94.

The inputs from the buttons and switches at the panels 118 and 120 are periodically monitored by the panel interface cards 216. These inputs are transferred to the corresponding microprocessor as a set of status bits. The system maintains three sets of status bits. These are (1) the received status bits (2) the acted upon status bits and (3) the changed status bits. The changed status bits are the received bits that are different from the corresponding ones in the set that has been acted upon. The changed status bits therefore indicate functions which require action.

Referring to FIG. 21, entry for the CPU type 2 code is made at a start 770. The operations carried out in the type 2 CPU are to monitor inputs to determine if there has been a change in the status for that input. If there has been a change in status, the corresponding functional operations are carried out to shift the mechanical operation from its present state to another state. From start 770, the system enters a question block 772 which questions if there is a change in the input for the aligners 58. This is produced by the toggle switch 230 at panel 118. If there has been a change in the switch, the yes exit is taken to an operational block 774 which generates a command to change the position of the aligners 58.

If there has been no change in the input for the aligners, the no exit is taken from question block 772 to a question block 776. Within this block, a check is made for the input for the rear shoes in assembly 54. This input is provided from the toggle switch 232 at the panel 118. If a change has been made, the yes exit is taken from the question block 776 the rear shoes are raised or lowered by operation block 778 depending upon the change that caused this path to be taken. The commands are then issued to change the position of the rear shoes in the assembly 54. If the shoes are expanded, they are retracted. If the shoes are retracted, they are expanded.

If the response to the question in block 776 is negative, the no exit is taken to a question block 780. The block 780 determines if there is a change in the input for the wheels 36 and 38. These inputs are from the buttons 234 and 236 at the panel 118. If there has been a change, the yes exit is taken to an operation block 782 which generates the command for changing the position of the wheels 38.

If the inquiry made in question block 780 is negative, the no exit is taken to a question block 784 to determine if there has been a change in the status of the brake input, which is provided by the toggle switch 238 at panel 118. If there has been a change, the yes exit is taken to an operation block 786 which causes generation of signals for activating a change in the position of the brake arms 46 by activation of the piston 48.

If there has been no change in the break input in block 784, the no exit is taken to a question block 788. This inquires if there has been a change in the forward-/reverse travel direction for the internal welder unit 30. If so, the yes exit is taken to an operation block 790 where commands are issued for changing the polarity connection of the battery 50 to the motor 35.

If no change has been made in question block 788, the no exit is taken to a question block 792 to determine if the wire clear button 252 has a changed status bit. If so, the yes exit is taken to an operation block 794 to implement the wire clear function by operation of the actuator 168 shown in FIG. 2. If button 252 is depressed, the wire is fed into the gap. If it is released, the feed is stopped.

If the response to question block 792 is negative, the system enters a question block 796 to determine if there has been a change in the status of the clockwise rotation button 254. If so, the system enters an operation block 798 to change the status of clockwise rotation. If the button has been depressed, the ring 344 is driven by the motor 110 in a clockwise direction. If the button has been released, the clockwise rotation is terminated.

If the response to the question block 796 is no, the system enters a question block 800 to determine if there has been a change in the counterclockwise rotation button 256 at panel 118. If there has been a change, the yes exit is taken to an operation block 802. As described above, this change is the rotation status in the counter-clockwise direction. If the motor 10 has been activated for counter-clockwise rotation, it is deactivated. If it is inactive, it is then activated for counter-clockwise rotation.

If the no exit is taken from the question block 800, the system enters the question block 804.

In the question block 804, an inquiry is made as to the status of the front shoes input, which is the toggle switch 258, shown in FIG. 5. If there has been a change in this switch, the yes exit is taken to an operation block 806 to change the position of the front shoes in the assembly 52. The shoes are caused to change position between the expanded and retracted positions by operation of pneumatic actuators.

If the response to question block 804 is negative, the system enters a question block 808 to determine if there is a change in the clockwise gas toggle switch 260 in FIG. 5. If there has been a change, the yes exit it taken to an operation block 810 to change the gas flow to the torches. The gas flow is either turned on or off.

If the response to the question block 808 is negative, the system enters a question block 812 to make a similar inquiry about the counter-clockwise gas switch 262. If a change has been made in this switch, the yes exit is taken to the operation block 814 to generate the command necessary to change the status of the valve providing the gas for the counter-clockwise welding pass.

If the response to the inquiry in block 812 is negative, the system enters a question block 816 to determine if there has been a change in the button 266 for the clockwise welder 1 wire feed. If there has been a change in this button, the yes exit is taken to an operation block 818 which changes the status of the wire feed for the number 1 clockwise internal welder. This either initiates or terminates the wire feed.

If the response to question block 816 is negative, entry is made to a question block 820 to determine if the button 268 at panel 118 has been depressed to activate the wire feed for the clockwise internal welder number 2. If the response is yes, entry is made to an operation block 822 to change the status of the wire feed for the clockwise number 2 welder.

If the response to question block 820 is negative, a question block 824 is entered to determine if there has been a change in the status of button 270 at panel 118 for the wire feed of the counterclockwise welder number 1. If so, the yes exit is taken to an operation block 826 to change the status of the wire feed for the counterclockwise welder number 1.

If a no response is made in operation block 824, the system enters a question block 828 to examiner the status of the button 272 to determine if there should be a change in the status of the wire feed for the counterclockwise welder number 2. If so, the yes exit is taken to an operation block 830 which generates the commands for either stopping or starting the wire feed for the counterclockwise welder number 2.

If the response to the question block 828 is negative, entry is made to a question block 832 to determine if there is a change in the switch 244 for fast and slow travel of internal welder unit 30. If there has been a change, the yes exit is taken to an operation block 834 which changes the battery connections between battery 50 and the motor 35 to provide the other available voltage. If there has been no change in the switch 234, the no exit is taken to the return 836.

An entry is made to the return 836 from each of the operation blocks 774, 778, 782, 786, 790, 794, 798, 802, 806, 810, 814, 818, 822, 826, 830 and 834.

The code listing for FIG. 21 is as follows.

```
/*
 DANAL2.C
 */
extern char *STATUSBUFFER;
extern char *PIBBUFFER;
/* Common DANAL data - Located in DANAL0 */
extern char local_status[ ];
extern char processed_status[ ];
extern char changed_status[ ];
extern char *pointer;
extern char RESTARTIP;
#include <danal.def>
#include <input2.def>
void danal2 ( )
{
    char status_mask;
    /* Get the current status reading for the CPU */
    pointer = STATUSBUFFER;      /* address the status buffer   */
    local_status[0] = *pointer;  /* get status byte 1 pts 1-8   */
    pointer += 1;
    local_status[1] = *pointer;  /* get status byte 2 pts 9-16  */
    pointer = PIBBUFFER;         /* Address PIB buffer          */
    local_status[2] = *pointer;  /* get status byte 3           */
    local_status[3] = *pointer;  /* get status byte 4           */
    local_status[4] = *pointer;  /* get status byte 5           */
    /* Compare the Internal Welder Input2.def local_status [0] byte   */
    /* with the present version of the processed_status [0] byte. If  */
    /* local_status [0] varies from processed_status [0], update      */
    /* processed_status [0] by invoking the appropriate routine(s).   */
    if (processed_status[0] != local_status[0] )
    {
        /* Isolate those bits where local_status [0] has changed. */
        changed_status [0] = processed_status [0]   local_status [0] ;
        /* If the controlling status bit has changed, */
        /* invoke the function for this bit changing. */
        if (changed_status[0] & TVL_MOTOR_LS)
            chg_tvl_motor_ls ( );
        if (changed_status[0] & ALIGNERS_UP_LS)
            chg_aligners_up_ls ( );
        if (changed_status[0] & BRAKE_LS)
            chg_brake_ls ( );
        if (changed_status[0] & SHOES_PRESSURE_SW)
            chg_shoes_pressure_sw ( );
    }    /* end of digital status[0] change process */
/* Update processed_status [1] only if the local_status [1] */
/* varies from the old processed_status [1]. */
if (processed_status[1] != local_status[1] )
{
    /* Isolate those bits where status [1] has changed. */
    changed_status[1] = processed_status[1]   local _status[1] ;
```

```
/* If the controlling status bit has changed, */
/* invoke the function for this bit changing. */
    if (changed_status[1]& TEACH_HOME_BUTTON)
        chg_teach_home_button ( );
    if (changed_status[1] & TEACH_CWSTART_BUTTON)
        chg_teach_cwstart_button ( );
    if (changed_status[1] & TEACH_CWSTOP_BUTTON)
        chg_teach_cwstop_button ( );
    if (changed_status[1] & TEACH_CCWSTART_BUTTON)
        chg_teach_ccwstart_button ( );
    if (changed_status[1]& TEACH_CCWSTOP_BUTTON)
        chg_teach_ccwstop_button ( );
    }    /* end of digital status[1] change process */
/* Look at the Internal Welder front end control panel.    */
/* Update processed_status [2] only if the local_status [2]    */
/* varies from the old processed_status [2].    */
if (processed_status[2] != local_status[2])
{
    /* Isolate those bits where status[2] has changed. */
    changed_status[2] = processed_status[2]    local_status[2];
    /* If the controlling status bit has changed, */
    /* invoke the function for this bit changing. */
    if (changed_status[2] & FAST_TRAVEL_REQ)
        chg_fast_travel_req ( );
    if (changed_status[2] & CCW2_WIRE_PB_REQ)
        chg_ccw2_wire_pb_req ( );
    if (changed_status[2] & CCW1_WIRE_PB_REQ)
        chg_ccw1_wire_pb_req ( );
    if (changed_status[2] & CW2_WIRE_PB_REQ)
        chg_cw2_wire_pb_req ( );
    if (changed_status[2] & CW1_WIRE_PB_REQ)
        chg_cw1_wire_pb_req ( );
    if (changed_status[2] & CCW_GAS_REQ)
        chg_ccw_gas_req ( );
    if (changed_status[2] & CW_GAS_REQ)
        chg_cw_gas_req ( );
    if (changed_status[2] & FRONT_SHOES_EXTEND_REQ)
        chg_front_shoes_extend_req ( );
    }    /* end of digital status[2] change process */
/* Look at the Internal Welder front end control panel.    */
/* Update processed_status [3] only if the local_status [3]    */
/* varies from the old processed_status [3].    */
if (processed_status[3] != local_status[3])
    /* Isolate those bits where status[3] has changed. */
    changed_status[3] = processed_status[3]    local_status[3];
    /* If the controlling status bit has changed, */
    /* invoke the function for this bit changing. */
    if (changed_status[3] & ALIGNERS_UP_REQ)
        chg_aligners_up_req ( );
    if (changed_status[3] & REAR_SHOES_UP_REQ)
        chg_rear_shoes_up_req ( );
    if (changed_status[3] & REAR_SHOES_DOWN_REQ)
        chg_rear_shoes_down_req ( );
    if (changed_status[3] & DRIVE_WHEEL_DOWN_REQ)
        chg_drive_wheel_down_req ( );
    if (changed_status[3] & DRIVE_WHEEL_UP_REQ)
        chg_drive_wheel_up_req ( );
    if (changed_status[3] & BRAKE_OFF_REQ)
        chg_brake_off_req ( );
    if (changed_status[3] & TRAVEL_FWD_REQ)
        chg_travel_fwd_req ( );
    if (changed_status[3] & TRAVEL_REV_REQ)
        chg_travel_rev_req ( );
    }    /* end of digital status[3] change process */
/* Look at the Internal Welder front end control panel.    */
/* Update processed_status [4] only if the local_status [4]    */
/* varies from the old processed_status [4].    */
if (processed_status[4] != local_status[4])
{
    /* Isolate those bits where status[4 ] has changed. */
    changed_status[4] = processed_status[4]    local_status[4];
    /* If the controlling status bit has changed, */
    /* invoke the function for this bit changing. */
    if (changed_status[4] & WIRE_CLEAR_REQ)
        chg_wire_clear_req ( );
    if (changed_status[4] & CW_ROTATE_REQ)
        chg_cw_rotate_req ( );
    if (changed_status[4] & CCW_ROTATE_REQ)
        chg_ccw_rotate_req ( );
    }    /* end of digital status[4] change process */
if (RESTARTIP)
{
    ioerror = turnon (&PILOT_LAMP);
    RESTARTIP = 0;
    }
}    /* end of danal2 */
```

Figure 22:
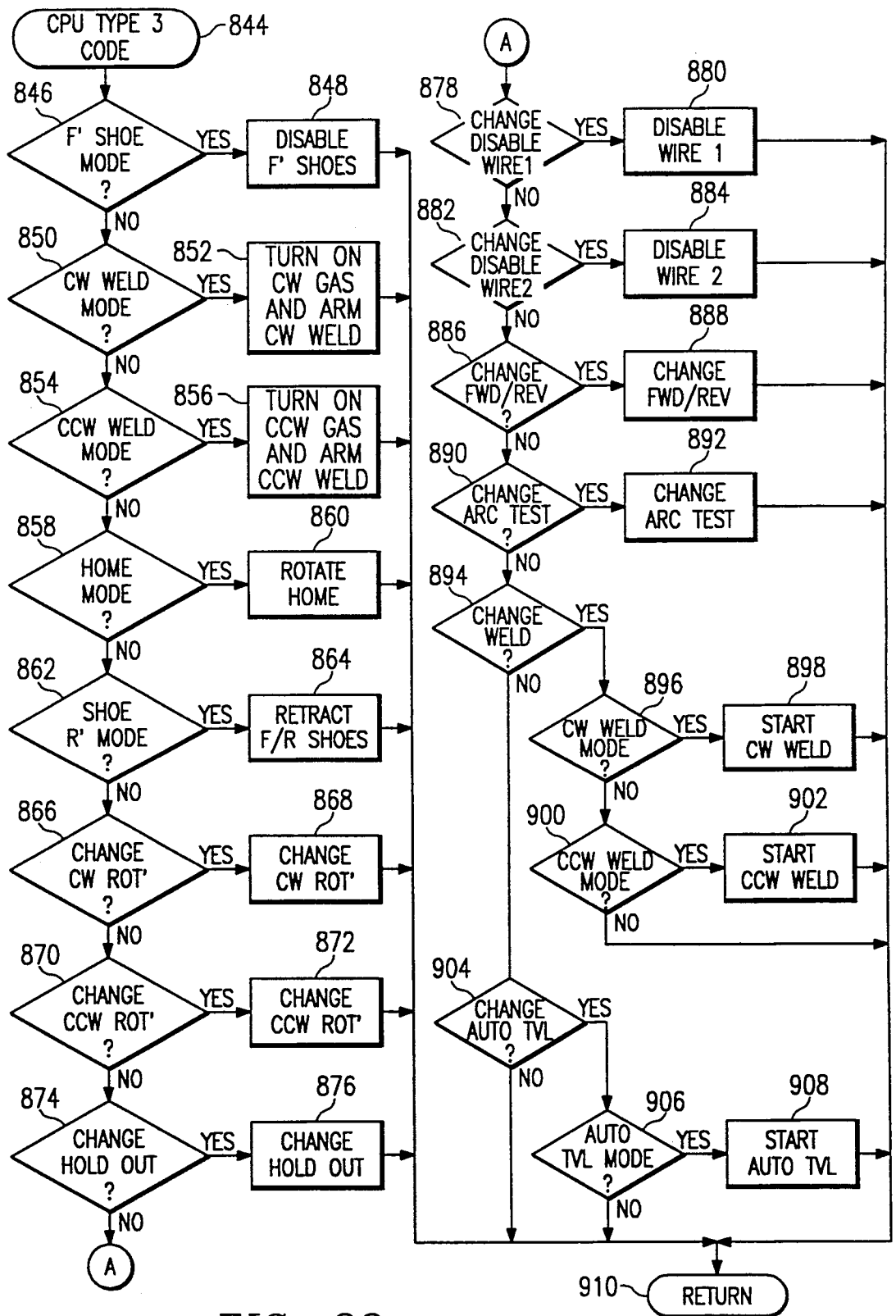
FIG. 22 is a flow diagram illustrating the operation of the CPU 3 applications.

The CPU type 3 code operations are described in reference to FIG. 22. The number 3 CPU is located in the microprocessor control unit 96 at the reach rod control box 84.

The operations carried out in the CPU type 3 are principally in response to the inputs at the reach rod control box which has control panel 120. These inputs are received from the panel interface card 206 associated with the microprocessor control unit 96. Note that the unit 96 is not directly connected to control any of the mechanical or electrical functions of the welding or related functional operations. Thus, all of the control operations must be done by the generation of commands which are transmitted via the communications link 100 to the appropriate microprocessor controllers, principally control units 92 and 94. As noted above, each particular operational function has been previously defined in a programmable read only memory so that the microprocessor control unit can select an appropriate GSC address and corresponding command to carry out the functions required when an input is received.

Referring to FIG. 22, the CPU Type 3 code begins with a start 844. From this start, the system enters a question block 846 to determine if there has been a change in the status bit for the front shoe mode, which is position 284 on the panel 120 shown in FIG. 6. If there has been a change in this status bit, the yes exit is taken to a function block 848 to perform the actions necessary for the front shoes These are included in assembly 52 and are activated by pneumatic power provided through a solenoid. If the command from the panel is to raise the shoes, a command signal is sent to the solenoid to raise the shoes, but if the command is to lower the shoes, an appropriate command signal is sent to the solenoid to lower the front shoes.

If there has been no change in the front shoe mode, the no exit is taken from question block 846 to a question block 850 to determine if there has been a change in the clockwise weld mode status bit, which corresponds to position 286 at panel 120. If the response is yes, an operation block 852 is entered which causes commands to be generated for turning on the clockwise gas and arming the clockwise weld operation. The actual weld operation is not initiated until the weld start button 306 is pressed.

If the no exit is taken from question block 850, entry is made to a question block 854 to determine if there has been a change in the counterclockwise weld mode. This corresponds to position 290 of the switch 280 on panel 120. If there has been a change in this mode, the yes exit is taken to an operation block 856 which generates commands to turn on the counterclockwise gas and arm the counterclockwise weld operation. However, the weld operation is not initiated until the weld start button 306 is pressed.

If the no exit is taken from question block 854, entry is made to a question block 858 to determine if there has been a change in the status bit for the home mode which corresponds to position 294 of the switch 280. If the response is positive, the yes exit is taken to an operation block 860 which rotates the ring 344 to bring the welder 340 to the home position 354.

If the response to question block 858 is negative, the no exit is taken to a question block 862 which determines if there has been a change in the shoe retract mode which corresponds to position 298 of switch 280. If the response is positive, that is, there has been a change in this status bit, the yes exit is taken to an operation block 864 which generates the commands for retracting the front and rear shoes which correspond to assemblies 52 and 54. This is done by an electrical signal which drives a solenoid to activate pneumatic valves for these assemblies.

If the no exit is taken from question block 862, entry is made to a question block 866 to determine if there is a change the status bit for the clockwise rotation button 310 at panel 120. If there is, the yes exit is taken to an operation block 868 to change to examine the state of the clockwise rotation status bit. This block generates commands to cause the ring 344 to rotate in the clockwise direction, if so commanded.

If the no exit is taken from the question block 866, entry is made to a question block 870 which determines that there is a change status bit for the counterclockwise rotation button 312 at panel 120. If so, entry is made to ar operation block 872 to examine the state of counterclockwise rotation status bit. If the button has been depressed, rotation in the counterclockwise direction of ring 344 will be initiated. If the button 312 has been released, rotation of the ring 344 is stopped.

If the no exit is taken from question block 870, entry is made to a question block 874 to determine if there is a change status bit for the hold out button 308 at panel 120. If there has been a status change, entry is made to an operation block 876 to change the holdout operation. If button 308 has been depressed, as indicated by the corresponding status bit, the welding operation in progress is stopped.

If the no exit is taken from the question block 874, entry is made to a question block 878 to determine if there has been a change in the wire status bit corresponding to toggle switch 316 at panel 120. When switch 316 is in the off position, the wire feed for the No. 1 welder (336 or 340) is disabled, but when it is in the on position, the wire feed for the no. 1 welder is enabled. If the yes exit is taken from question block 878, entry is made to an operation block 880 to disable the no. 1 wire 1 feed if switch 316 is off. The wire feed is enabled if switch 316 is on.

If the no exit is taken from question block 878, entry is made to a question block 882 to determine if there has been a change in the status bit for the wire feed for torch no. 2 (338 or 342) which is switch 318. If true, the yes exit is taken to an operation block 884 which causes a disable for the wire feed for welder no. 2 if the switch is in the off position. If the switch is in the on position, the wire feed for welders no. 2 will be enabled.

If the no exit is taken from question block 882, entry is made to a question block 886. Within this block, an inquiry is made to determine if the status bit for the forward/reverse switch 324 has been changed. This switch provides for the direction of travel of the unit 30 in the pipeline. If this status bit has been changed, an operation block 888 is entered to generate the commands for changing the direction of travel for the unit 30 as set by the switch 324.

If the no exit is taken from the question block 886, entry is made to a question block 890 to determine if there is a status change bit for the arc test button 322 at panel 120. If there has been such a change, the yes exit is taken to an operation block 892 to initiate the arc test if button 322 is depressed and to terminate the arc voltage is the button is released. The arc test result is produced at the displays 326 and 328 at panel 120.

The question block 894 is entered if the no exit is taken from the question block 890. This question determines if there is a status changed bit for the weld-start button 306. If the status has changed, and button 306 is depressed to initiate a weld, the yes exit is taken to a question block 896. Within the block 896, a determination is made if the clockwise weld mode has been armed. This is in reference to operations that are carried out in operation block 852. If the response is positive the yes exit is taken to operation block 898 which generates the commands to start the clockwise weld process, as described above.

If the no exit is taken from question block 896, entry is made to a question block 900 to determine if the counterclockwise weld mode has been armed. This is established by the operation block 856. If so, the yes exit is taken to an operation block 902 which initiates the counterclockwise weld process. A no response to question block 900 transfers the system to a return 910.

Referring back to question block 894, if there is a negative response, entry is made to a question block 904 to determine if there is a changed status bit for the auto travel, which is position 300 of the switch 280 in panel 120. If there is a changed status bit, the yes exit is taken to a question block 906 to determine if there is a change status bit for the auto-travel button 302 at panel 120. If so, entry is made to an operation block 908 to initiate the automatic travel of the unit 30 by operation of the drive motors.

The no exits from question blocks 904 and 906 both go to the return 910.

Entry is made to the return 910 from each of operation blocks 848, 852, 856, 860, 864, 868, 872, 876, 880, 884, 888, 892, 898, 902 and 908.

Describing the operation of the CPU type 3 microprocessor control unit in general, referring to FIG. 22, the system scans through each of the status bits for the functions listed in the question blocks. If there is no changed status bit, the system cycles through to the return 910 and starts the operation over again. But, when the weld operation has been enabled, by either of the operation blocks 852 or 856 and the weld start button 306 has been depressed, the clockwise or counterclockwise weld passes are initiated.

The code for FIG. 22 is listed below.

```
/*
    DANAL3.C
*/
extern char *PIBBUFFER;
extern char turnon ( );
extern char turnoff ( );
extern char local_status [ ];
extern char processed_status [ ];
```

-continued

```c
extern char changed_status [ ];
extern int bg_analogs [ ];
#include <danal.def>
#include <input3.def>
/*    WORK VALUES      */
extern char *pointer;
extern unsigned char mode_reading;
extern char mode;
extern char current_mode;
void danal3 ( )
{
char i;
char status_mask;
    /* Get the current status reading for the CPU */
    pointer = PIBBUFFER;      /* Address PIB buffer   */
    local_status [0] = *pointer;   /* get status byte 1    */
    local_status [1] = *pointer;   /* get status byte 2    */
void cpu3_mode ( )
{
    switch (mode)
    {
        case 1:       /* Auto Travel */
            if (current_mode == 6)
                turnoff (&REAR_SHOES_RET);
            else if (current_mode == 2) /* if front shoes ext. */
                turnoff (&FRONT_SHOES);
            break;
        case 2:       /* Front Shoes */
            if (current_mode == 1)
            {
                turnoff (&TRAVEL_FWD);
                turnoff (&FAST_TRAVEL);
                turnoff (&AUTO_TRAVEL_LAMP);
                /* Before turning on the front shoes, insure that the
                aligners up signal is not on. */
                if (systemstatus & aligners_up)
                    showerror (operr203);
                else
                    turnon (&FRONT_SHOES);
            }
            else if (current_mode == 3)
                turnoff (&CW_GAS);
            else
                showerror (operr214);
            break;
        case 3:       /* CW Weld */
            if (current_mode == 2)
            {
                turnon (&CW_GAS);
            }
            else if (current_mode == 4)
            {
                turnoff (&CCW_GAS);
                turnon (&CW_GAS);
            }
            else
                showerror (operr214);
            break;
        case 4:       /* CCW Weld */
            if (current_mode == 3)
            {
                if ((systemstatus & cw_welding) == 0)
                {
                    turnoff (&CW_GAS);
                    turnon (&CCW_GAS);
                }
                else
                    showerror (operr220);
            }
            else if (current_mode == 5)
            {
                txcmdoff (rotate_to_home); /* Turn off rotate to home command */
                turnon (&CCW_GAS);
            }
            else
                showerror (operr214);
            break;
        case 5:  /* Causes the ring to rotate to the home position. */
            if (current_mode == 4)
            {
                turnoff (&CCW_GAS);
                if ((systemstatus & at_home) == 0) /* if not at the home
```

```
position */
                txcmdon (rotate_to_home);    /* Send rotation command */
              break;
            }
            else if (current_mode == 6)
            {
              if ((systemstatus & at_home) == 0) /* if not at the home position
*/
                txcmdon (rotate_to_home);    /* Turn on rotate to home
command*/
              turnon (&FRONT_SHOES);
              turnoff (&REAR_SHOES_RET);
            }
            else
                showerror (operr214);
            break;
        case 6:    /* Front and Rear Shoe Retract */
            if (current_mode == 5)
            {
              txcmdoff (rotate_to_home); /* Turn off rotate to home command */
              turnoff (&FRONT_SHOES);
              turnon (&REAR_SHOES_RET);
            }
            else if (current_mode = 1)
            {
              turnoff (&TRAVEL_FWD);
              turnoff (&FAST_TRAVEL);
              turnoff (&AUTO_TRAVEL_LAMP);
            }
            else
                showerror (operr214);
            break;
        default:
            showerror (operr216);
        }
    } /* end of cpu3_mode */
/* Compare the Internal Welder Input3.def local_status [0] byte with      */
/* the present version of the processed_status [0] byte. If               */
/* local_status [0] varies from processed_status [0], update              */
/* processed_status [0] by invoking the appropriate routine(s).           */
/* Look at the reach rod control panel signals.      */
    if (processed_status [0] != local_status [0] )
    {
        changed_status [0] = processed_status [0]    local_status [0];
        if (changed_status [0] & CW_ROTATE_PB)
            chg_cw_rotate_pb ( );
        if (changed_status [0] & CCW_ROTATE_PB)
            chg_ccw_rotate_pb ( );
        if (changed_status [0] & HOLD_OUT_PB)
            chg_hold_out_pb ( );
        if (changed_status [0] & WIRE_1_ENABLE)
            chg_wire_1_enable ( );
        if (changed_status [0] & WIRE_2_ENABLE)
            chg_wire_2_enable ( );
        if (changed_status [1] & TRAVEL_FWD_TS)
            chg_travel_fwd_ts ( );
        if (changed_status [1] & TRAVEL_REV_TS)
            chg_travel_rev_ts ( );
        if (changed_status [0] & ARC_TEST_PB)
            chg_arc_test_pb ( );
    }    /* end of digital status [0] change process */
/* Look at the remaining reach rod control panel signals. */
    if (processed_status [1] != local_status [1])
    {
        /* Isolate those bits where status [1] has changed. */
        changed_status [1] = processed_status [1]    local_status [1] ;
        if (changed_status [0] & WELD_START_PB)
        {
            if (local_status [0] & WELD_START_PB) /* If the bit is now on, */
            {
                if (curent_mode == 3) /* Test to see what mode we are in */
                    txcmdon (cw_weld);
                else
                {
                    if (current_mode == 4)
                        txcmdon (ccw_weld);
                    else
                        show_error (operr217); /* ERROR - Not mode 3 or 4 */
                }
            }
            /* however, if the bit is now off, */
            else
```

```
{
    /* Test to see what mode we are in */
    if (current_mode == 3)
        txcmdoff (cw_weld);
    else
    {
        if (current_mode == 4)
            txcmdoff (ccw_weld);
        else
            show_error (operr217); /* ERROR - Not mode 3 or 4 */
    }
    processed_status [0] = processed_status [0]
        & andnot (WELD_START_PB);
    }
}      /* end of chg_weld_start_pb */
if (changed_status [0] & AUTO_TRAVEL_PB)
{
    /* If the bit is now on, */
    if (local_status [0] & AUTO_TRAVEL_PB)
    {
        if ((systemstatus & pipe) == 0)
            show_error (operr204);
        else
        {
            if (current_mode == 1)
            {
                turnon (&TRAVEL_FWD);
                turnon (&FAST_TRAVEL);
                turnon (&AUTO_TRAVEL_LAMP);
            }
            else
                show_error (operr205); /* not in the autotravel position */
        }
        processed_status [0] = processed_status [0] | AUTO_TRAVEL_PB;
    }
    /* however, if the bit is now off, */
    else
        processed_status [0] = processed_status [0]
            & andnot (AUTO_TRAVEL_PB);
    }      /* end of chg_auto_travel_pb */
}      /* end of digital status [1] change process */
}  /* end of danal3 */
```

The operation for a type 4 microprocessor control unit is shown in FIG. 23. In the present embodiment, the type 4 CPU, control unit 98 performs only a receive function and produces an analog signal for controlling the power supply 104. Therefore this operation is executed only in response to a communication interrupt, that is, when the control unit receives a transmission of a digitized arc voltage sample via the communication link 102. A start 911 leads to a return 912 which returns operation to bock 700 in FIG. 19.

FIG. 24 illustrates a communication interrupt operation which is carried out in any of the control units upon receipt of a transmission to the control unit from the link 100. Upon receipt of a communication interrupt 913, an operation corresponding the received communication is carried out, for example, as shown in operation block 914. These examples are turn on motor, activate solenoid, read status bit, etc.

The corresponding code listings for FIG. 24 as follows.

```
/*
    DANAL4.C
*/
void danal4 ( )
{
}
```

The interrupt routine shown in FIG. 24 is written in assembly language.

Figure 25:
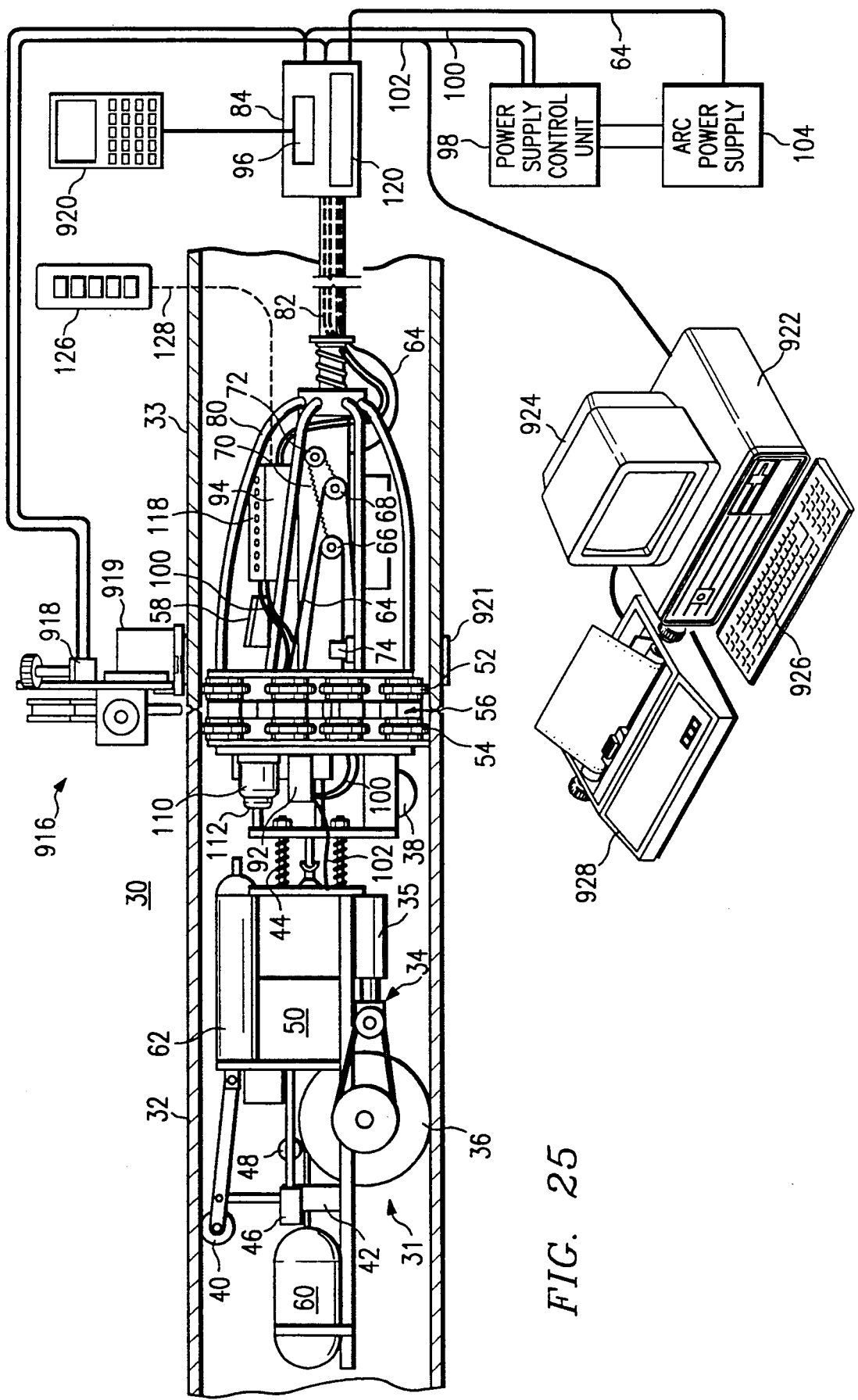
FIG. 25 is a welding system which incorporates the present invention and includes an external welder, a printer and a hand-held programming unit and a hand-training unit.

Referring to FIG. 25, there is illustrated an expansion of the welding system shown in FIG. 1. In addition to the equipment shown in FIG. 1, there is included an external welder 916, as described in U.S. Pat. Nos. 3,718,798 to Randolph et al which issued on Feb. 27, 1973 and 3,806,694 to Nelson et al. which issued on Apr. 23, 1974, both of which are incorporated herein by reference Welder 916 is provided with a microprocessor control unit 918 which is connected to the communication link 100. The unit 918 includes a CPU card 202, a power card 204, an analog input card 210, an encoder motor card 214 and a dual EMF motor card 216. These are the cards necessary to automatically control the operation of the external welder 916. This welder likewise has an encoder on the drive motor to indicate the position of the welder.

The external welder 916 includes a drive assembly 919 which is mounted or a track 921 that encircles and is clamped to the pipe joint 33. The drive assembly 919 is controlled by the microprocessor control unit 918 for positioning the welder 916 along the gap at the junction of the pipe joints 32 and 33. Representative welders which can perform this function are shown in U.S. Pat. Nos. 3,193,656 to Bell et al. which issued on July 6, 1965, 3,974,356 to Nelson et al. which issued on Aug. 10, 1976, 4,151,395 to Kushner et al. which issued on Apr. 24, 1979, and each of these patents is incorporated herein by reference.

The parameters for the automatic welding operations described above are set into the control system via a hand-held terminal 920 which is connected to the RS232 port of any of the microprocessor control units.

Parameters are entered through terminal 920 and are stored in a parameter file in the memory for the microprocessor. The same file is maintained in all of the control units 92, 94, 96, 98 and 918. When one microprocessor receives an update or change, the modified file is transmitted via the link 100 to all of the other control units so that all parameter files remain the same. The parameters which are entered via the terminal 920 include the desired initial and final travel speeds for the internal and external welders, the initial and final wire feed speeds, the initial and final arc voltages and the incremental rates of change for each of these parameters.

A selected embodiment of the terminal 920 is a "Q-Term" terminal which is made by QSI Corporation located in Logan, UT.

The system shown in FIG. 25 further includes a computer 922 which has a screen 924, a keyboard 926 and a printer 928. The computer 922 is connected to the communication link 100. With this connection, an operator at the computer 922 can monitor or control all of the operations being carried out by the welding control system. One particular application for the computer 922 is to monitor and record the parameters for each weld produced by the internal and external welders. These parameters can include time of weld, duration, arc voltage, joint location and any other parameters which it is desired to monitor. Such a record of the welds can serve as a quality control monitor and a reference for future use should a review of each weld be needed.

The operation of the external welder 916 can be coordinated with that of the internal welders to improve quality and productivity. Through the communication link 100, the external welder can follow the welding position of the corresponding internal welder so that the external welder is working in the heat produced by the internal welder. Multiple external welders, such as 916, may be used such as one external welder for each internal welder. All of these operations can be coordinated through the welding control system described herein.

Additional microprocessor control units can be added to the welding control system described above by attachment to the communication link 100. These added units can provide processing power for calculations, mechanical control, operator inputs and data collection.

Figure 26:
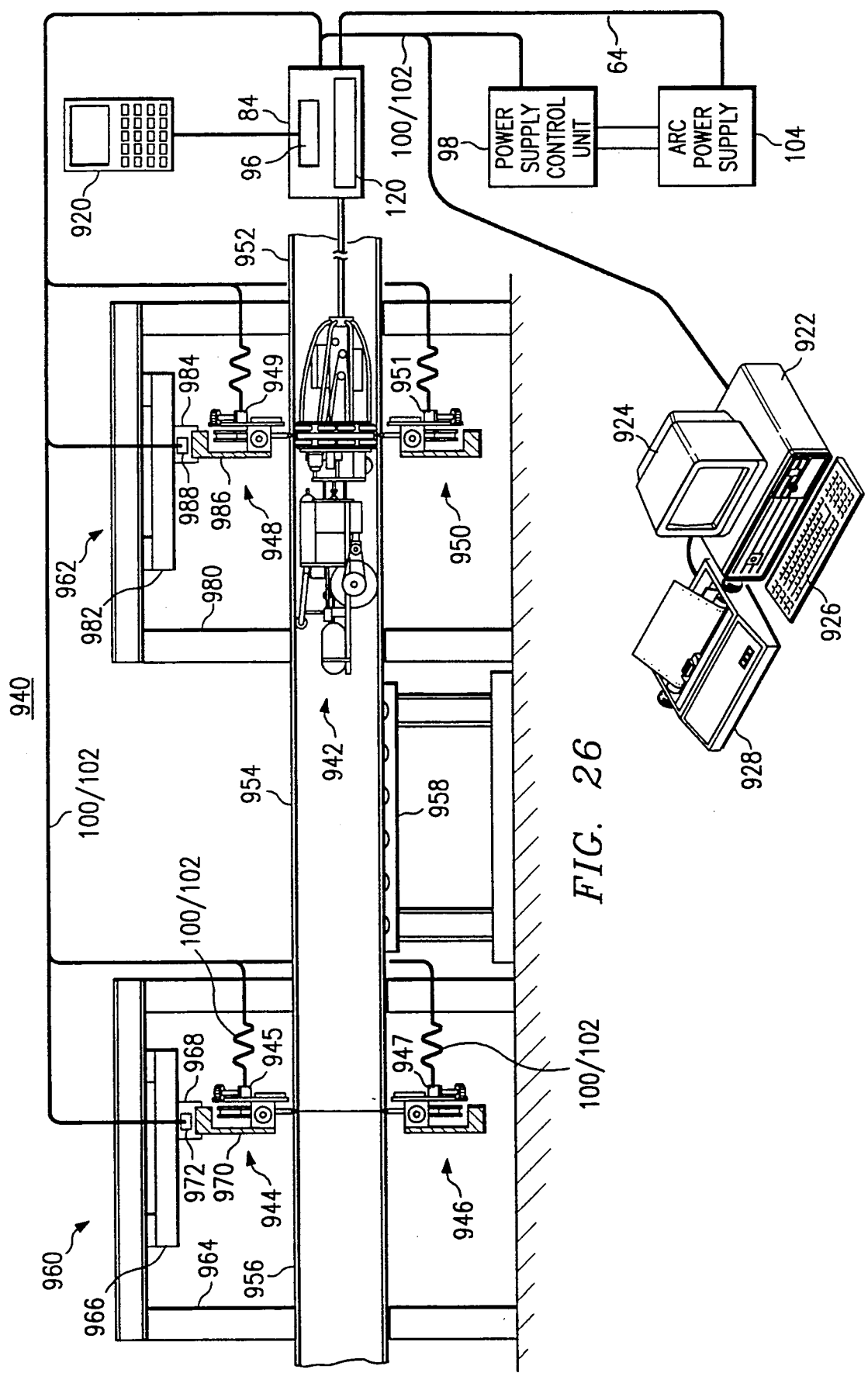
FIG. 26 is a rack welding system which incorporates the present invention and includes a plurality of welding stations directed by a common control system.

Referring to FIG. 26 there is illustrated a rack welding system 940 which utilizes the present invention. This system includes an internal welder unit 942, as shown in FIG. 1 and a group of external welders 944, 946, 948 and 950, each of which corresponds to the external welder 916 shown in FIG. 25. The external welders 944, 946, 948 and 950 have respective microprocessor control units 945, 947, 949 and 951. Each of these microprocessor control units is connected to control the functions of the corresponding external welder.

The system 940 is shown working with three pipe joints 952, 954 and 956. These pipe joints are supported by a series of roller supports, such as support 958.

System 940 includes welding stations 960 and 962. Station 960 includes a support frame assembly 964 which includes a track 966. A drive assembly 968 is mounted for travel along track 966 and includes a motor for rotating a ring 970 which supports the external welders 944 and 946. A microprocessor control unit 972 is mounted on the drive assembly 968 for controlling the motors therein. The communication link 100 and power lines 102 are likewise connected to the microprocessor control unit 972. This control unit is similar to the previously described microprocessor control units 92, 94, 96 and 98. In response to commands received through the communication link 100, the drive assembly 968 is activated to position the external welders 944 longitudinally along the pipe joint 956 and rotationally in the proper position about the pipe joint 956. The assembly also functions to rotate the external welders 944 and 946 about the pipe joint 956.

Welding station 962 likewise has a frame assembly 980 which has a track 982. A drive assembly 984 is mounted on the track 982 and includes a motor for positioning the assembly 984 along the track 982. Drive assembly 984 further includes a drive motor for rotating a ring 986 which supports the external welders 948 and 950. A microprocessor control unit 988 is mounted on the drive assembly 984 for controlling the motors therein. The control unit 988 is likewise connected to the communication link 100 and the power lines 102. The microprocessor control unit 988 is similar to the above described microprocessor control units 92, 94, 96 and 98.

The control system for the rack welding system 940 includes the same features as described above in reference to FIG. 17. The travel speed, arc voltage and wire speed for each of the internal and external welders can be controlled to provide high speed welding. Welding operations can be carried out by extending the above-described control system to include the external welders and the drive assemblies 968 and 984 which position the external welders. In a typical operation, the internal welder unit 942 provides the necessary internal welding passes at the junction of pipe joints 952 and 954 while the external welders 948 and 950 provide the initial pass or passes for the external weld. Concurrently, the external welders 944 and 946 are providing the final external weld passes at the junction of the joints 954 and 956.

Once these operations have been completed, the pipe joints are moved to the left one joint length so that the sequence of operations can be repeated. At the second setup, the external welders 944 and 946 provide all of the necessary additional external passes to complete the external weld at the junction of joints 952 and 954. Concurrently, the external welders 948 and 950 are providing the initial external passes for the next joint while the internal welder 942 is providing the internal weld passes at the new pipe junction.

The internal welder 942 operation can be coordinated with that of the external welders 948 and 950, in position, to have the external welders working into the heat created by the internal welders. This coordination can provide an improved joint and can enhance the speed of operation for the overall welding procedure.

In summary, the present invention is a method of welding operation which provides a relatively slow, but highly reliable start followed by a high speed welding pass with increased welder travel speed, faster wire feed speed and possible increased arc voltage.

The terminal 920 is used for setting initial conditions for a large number of pipeline welds and is not typically connected during routine operations. The computer 922 can be used for monitoring or operating any of the functions within the system 940. It can further be used to make a record of all welds for quality control and record keeping.

Although one embodiment of the invention has been illustrated in the accompanying drawings and described in the foregoing Detailed Description, it will be understood that the invention is not limited to the embodiment disclosed, tut is capable of numerous rearrangements, modifications and substitutions without departing from the scope of the invention.

What we claim is:

1. A method for welding together two workpieces which are butted together and have a gap at the junction of the workpieces, the welding performed by use of a welder which travels along the gap and provides n arc through a feed wire supplied to the gap, the method comprising the steps of:

establishing with respect to said gap a start point for a weld and a stop point for the weld, moving said welder along said gap at a first travel speed when said welder passes through said start point, and thereafter, starting the feed of said wire to said gap and initiating said arc at said gap when said welder passes through said start point, increasing the travel speed of said welder from a first travel speed at said start point to a second travel speed along said gap, after the initiation of said arc, increasing the speed of said wire to said gap until and wire speed reaches a preselected speed, and moving said welder along said gap at said second travel speed toward said stop point.

2. A method for welding as recited in claim 1 including the steps of reducing both the travel speed of said welder and said wire speed as said welder approaches said stop point so that said travel speed and wire speed are zero when said welder is at said stop point on said gap.

3. A method for welding as recited in claim 1 including the step of initiating said arc at a first voltage and increasing the voltage of said arc from said first voltage to a second voltage during a time essentially corresponding to the time that said welder increases speed from said first travel speed to said second travel speed.

4. A method for welding together two workpieces which are butted together and have a gap at the junction of the workpieces, the welding performed by use of a welder which travels along the gap and provides an arc through a feed wire supplied to the gap, the method comprising the steps of:

establishing with respect to said gap a start point for a weld and a stop point for the weld, moving said welder along said gap at a first travel speed when said welder passes said start point, and thereafter, starting the feed of said wire to said gap at a first wire speed and initiating said arc at said gap at a first voltage when said welder passes said start point, increasing the travel speed of said welder from said first travel speed at said start point to a second travel speed along said gap, concurrently with the step of increasing the travel sped of said welder, increasing the speed of said wire fed to said gap from said first wire speed to a second wire speed and increasing said arc voltage from said first voltage to a second voltage, moving said welder along said gap at said second travel speed toward said stop point while maintaining said second wire speed and said second voltage, and reducing the travel speed of said welder, said wire speed and said arc voltage as said welder approaches said stop point so that said travel speed, said wire speed and said arc voltage are zero when said welder is at said stop point on said gap.

* * * * *

UNITED STATES PATENT AND TRADEMARK OFFICE
CERTIFICATE OF CORRECTION

PATENT NO. : 5,059,765

DATED : October 22, 1991

INVENTOR(S) : Brian S. Laing

It is certified that error appears in the above-identified patent and that said Letters Patent is hereby corrected as shown below:

Col. 9, line 65, please delete the word "ar" and substitute therefor the word -- are --.

Col. 9, line 68, please delete the word "preferable" and substitute therefor the word -- preferably --.

Col. 14, line 35, please delete the word "the" and substitute therefor the word -- The --.

Col. 20, line 49, please delete the word "counter-clockwise" and substitute therefor the word -- counterclockwise --.

Col. 23, line 26, please delete the word "counter-clockwise" and substitute therefor the word -- counterclockwise --.

Col. 23, line 27, please delete the word "counter-clockwise" and substitute therefor the word -- counterclockwise --.

Col. 23, line 47, please delete the word "counter-clockwise" and substitute therefor the word -- counterclockwise --.

Col. 23, line 51, please delete the word "counter-clockwise" and substitute therefor the word -- counterclockwise --.

UNITED STATES PATENT AND TRADEMARK OFFICE
CERTIFICATE OF CORRECTION

PATENT NO. : 5,059,765

DATED : October 22, 1991

INVENTOR(S) : Brian S. Laing

It is certified that error appears in the above-identified patent and that said Letters Patent is hereby corrected as shown below:

Col. 24, line 7, please delete the word "examiner" and substitute therefor the word -- examine --.

Col. 24, line 43, immediately following the word "local_status[0", please insert the symbol -- ] --.

Col. 24, approximately line 54, immediately following the words and symbols "changed__status [0] = processed__status [0]", please insert the symbol -- ^ --.

Col. 24, line 68, immediately following the words and symbols "changed__status [1] = processed__status [1]", please insert the symbol -- ^ --.

Col. 25, approximately line 18, immediately following the words and symbols "changed_status [2] = processed__status [2]", please insert the symbol -- ^ --.

Col. 25, approximately lines 36-37, immediately following the line "if(processed__status[3]!=local__status[3])", please insert a new line containing the symbol -- { --.

Col. 25, approximately line 38, immediately following the words and symbols "changed__status [3] = processed__status [3]", please insert the symbol -- ^ --.

UNITED STATES PATENT AND TRADEMARK OFFICE
CERTIFICATE OF CORRECTION

PATENT NO. : 5,059,765

DATED : October 22, 1991

INVENTOR(S) : Brian S. Laing

It is certified that error appears in the above-identified patent and that said Letters Patent is hereby corrected as shown below:

Col. 25, approximately line 59, immediately following the words and symbols "changed__status [4] = processed__ status [4]", please insert the symbol -- ^ --.

Col. 27, line 16, immediately following the word "change", please insert the word "in".

Col. 27, line 26, please delete the word "ar" and substitute therefor the word -- an --.

Col. 27, lines 26-27, please delete the word "counterclcckwise" and substitute therefor the word -- counterclockwise --.

Col. 28, line 13, please delete the first occurrence of the word "is" and substitute therefor the word -- if --.

Col. 31, approximately line 38, immediately following the words and symbols "changed__status [0] = processed__ status [0]", please insert the symbol -- ^ --.

Col. 34, line 54, please delete the word "or" and substitute therefor the word -- on --.

Col. 37, line 9, please delete the word "n" and substitute therefor the word -- an --.

UNITED STATES PATENT AND TRADEMARK OFFICE
CERTIFICATE OF CORRECTION

PATENT NO. : 5,059,765

DATED : October 22, 1991

INVENTOR(S) : Brian S. Laing

It is certified that error appears in the above-identified patent and that said Letters Patent is hereby corrected as shown below:

Col. 37, line 24, please delete the word "and" and substitute therefor the word -- said --.

Signed and Sealed this

Eighteenth Day of May, 1993

Attest:

MICHAEL K. KIRK

Attesting Officer     Acting Commissioner of Patents and Trademarks